(12) United States Patent
Sandholm et al.

(10) Patent No.: US 7,343,294 B1
(45) Date of Patent: Mar. 11, 2008

(54) MULTI-CHANNEL MARKETING DATABASE DEVELOPMENT METHODOLOGY

(75) Inventors: Michelle R. Sandholm, Oakdale, MN (US); Sue Ann Freeborg, Birchwood, MN (US)

(73) Assignee: Fair Isaac Corporation, Minneapolis, MN (US)

( * ) Notice: Subject to any disclaimer, the term of this patent is extended or adjusted under 35 U.S.C. 154(b) by 1094 days.

(21) Appl. No.: 09/755,738

(22) Filed: Jan. 5, 2001

(51) Int. Cl.
*G06Q 99/00* (2006.01)

(52) U.S. Cl. .......................................... 705/1; 705/10

(58) Field of Classification Search .................... 705/1, 705/10
See application file for complete search history.

(56) References Cited

U.S. PATENT DOCUMENTS

| | | | | |
|---|---|---|---|---|
| 5,758,061 A | * | 5/1998 | Plum ............................ | 714/35 |
| 6,256,773 B1 | * | 7/2001 | Bowman-Amuah .......... | 717/121 |
| 6,384,843 B1 | * | 5/2002 | Harel .......................... | 715/762 |
| 6,408,263 B1 | * | 6/2002 | Summers ....................... | 703/6 |
| 6,662,357 B1 | * | 12/2003 | Bowman-Amuah .......... | 717/120 |
| 6,725,399 B1 | * | 4/2004 | Bowman ....................... | 714/38 |
| 6,738,736 B1 | * | 5/2004 | Bond ............................. | 703/2 |
| 6,738,746 B1 | * | 5/2004 | Barnard et al. ................. | 705/7 |
| 6,754,847 B2 | * | 6/2004 | Dalal et al. .................... | 714/27 |
| 6,792,399 B1 | * | 9/2004 | Phillips et al. .................. | 703/2 |
| 6,980,962 B1 | * | 12/2005 | Arganbright et al. .......... | 705/26 |
| 2004/0143470 A1 | * | 7/2004 | Myrick et al. .................. | 705/7 |

FOREIGN PATENT DOCUMENTS

JP EP000770967 A2 * 5/1997

OTHER PUBLICATIONS

Chia, Esmond, "An in-depth look at Customer Relationship Management", Dec. 13, 2000, E-Business II Final Paper, GBUS 888 A, pp. 1-15.*
Roman, Ernan, "The Underachieving Database," American Demographics Marketing Tolls Supplement, pp. 48-55, Jun. 1996.*
Close, Wendy S., "Database marketing: building long-term customer relationships for maximum profits." Telemarketing, v10, n5, p. 50, Nov. 1991.*
"Only the Ubiquitous Will Survive," Extraprise Publication—Extraprise Report, Vaol. 3, No. 5, Jun. 2000.*
www.clientlogic.com, retrieved from internet wayback machine, Aug. 15, 2000-Nov. 9, 2000.*

* cited by examiner

*Primary Examiner*—Jonathan Ouellette
(74) *Attorney, Agent, or Firm*—Michael A. Glenn; Glenn Patent Group

(57) ABSTRACT

A development methodology for a full-service, multi-channel marketing solution that helps retailers, financial services and telecommunications companies determine where, when and how to interact with their prospects and customers to build stronger relationships. The preferred embodiment of the invention results in an outsourced marketing solution that is tailored to the client's goals and resources, and that delivers everything the client needs to streamline the marketing process, including data warehousing, reports and queries, campaign management and execution, marketing strategy consulting, Internet information delivery services, promotion data processing, data enhancement, strategy design and execution, decisioning tools, optimization tools, and predictive and descriptive modeling.

84 Claims, 4 Drawing Sheets

MULTI-CHANNEL MARKETING DATABASE DEVELOPMENT METHODOLOGY

BACKGROUND OF THE INVENTION

1. Technical Field

The invention relates to marketing. More particularly, the invention relates to a development methodology for a multi-channel marketing database.

2. Description of the Prior Art

Direct marketing provides targeted marketing messages that are designed to compel individual consumers to purchase specific products or services. Direct marketing has been around for years. Increasingly, organizations are using multiple marketing channels, including outbound channels such as direct mail, telemarketing, e-mail, and direct response television, to deliver these messages to their customers. Organizations are also exploiting inbound channels, such the Web, customer call centers, and point of sale facilities. Such multi-channel integration provides the potential for retailers to deliver consistent messaging across all of their customer touchpoints, both inbound and outbound. This proliferation of message delivery mechanisms, coupled with the rapid development of new tools and techniques designed to increase the level of sophistication and accuracy allowed within a given marketing campaign, e.g. reporting, analysis, predictive modeling, campaign management, and optimization tools, has made the coordination of marketing messages within and across marketing campaigns more challenging to manage, more complicated to produce, and more critical to the success of any enterprise.

The increase in the number of marketing campaigns, the improving ability the market has to capture and retain detailed information on customer transactions, and the fact that all of this data is being managed and used by more and more people, as dictated by the limits of time and organization, create a greater need for integrated tools and systems to manage the data generated and repeatedly used by these individuals.

Prior solutions enabled marketers to target messages and offers to individual customers, but lacked the consistent ability to capture and integrate customer information and transaction data from across the enterprise. For example, a retailer may capture detailed transaction information at its physical store locations through its point-of-sale (POS) technology, but is unable to integrate that data with purchase history from its on-line store, even though the data were generated through sales to the exact same individual customer.

Additionally, users from different locations or working in different departments/divisions of a single enterprise seldom have access to the same customer data because this is captured and housed in legacy systems designed for specific tasks that are unique to an individual department or functional area. Information regarding any given customer, therefore, may be housed in many different computer systems, thus providing no single user with a complete understanding of the depth or breadth of a given customer relationship.

There are many publications, books, and periodicals which concern the subjects of database marketing, direct marketing, customer relationship management, one-to-one marketing, and relational database systems for account and customer management.

A sampling of these publications includes:

Customers.com—Patricia B. Seybold (a 1998 book about profitable business strategies for the Internet economy);

Stores—A National Retail Federation monthly publication, dealing with the challenges of technology and the Internet in retail store operations; and Internet Retailer—A Faulkner and Gray monthly publication dealing with merchandising and advertising challenges for Internet and multi-channel retailers.

However, there has been heretofore no solution available for enabling multi-channel marketers to analyze, create, track, control, coordinate, and execute marketing strategies across multiple customer touchpoints using various communications media and methods.

Key to developing such strategies is a methodology for implementing a system that achieves consistent results. In the past, custom database solutions were created for a client based upon the client's specified needs. With the development of a standard solution having a consistent hardware/software configuration and a standard data model for each market, it is necessary to create a development methodology that contains classic components, such as analysis, design, and implementation, yet that could be customized specific to a multi-channel marketing database.

The Company is organized around teams. Although this organizational structure works well for servicing clients, it often hinders sharing of the best practices across teams.

It would therefore be advantageous to provide a development methodology for a multi-channel marketing database. It would be further advantageous to provide a methodology that ensures consistent results and client deliverables when implementing a multi-channel marketing database. A development methodology also provides a guide for new employees to the company or existing employees who are involved in the development of a multi-channel marketing solution for the first time.

SUMMARY OF THE INVENTION

The invention provides a methodology for developing a service offering that enables multi-channel marketers to analyze, create, track, control, coordinate, and execute marketing strategies across multiple customer touchpoints using various communications media and methods.

The presently preferred embodiment of the invention provides a methodology that comprises five key phases:

1. Planning: In this phase the team is identified from both the Company and the client side. A kick-off meeting is planned that will be held between the client and the Company.

2. Discovery: In the discovery phase, the kick-off meeting is held, as well as a requirements gathering meeting where both business and technical requirements are identified and documented in a discovery document which is given to the client for approval.

3. Design: In this phase, the Company conducts several design meetings with the client to review data analysis from initial test files and determine specifications for data mapping, update rules, calculations, reports, and campaign management. This information is documented in a design document which is also given to the client for approval.

4. Development: During this phase, the Company creates unit and system test plans, creates and modifies actual programs and routines, and performs unit and system tests based upon the specifications outlined in the design document. The Company also establishes retention, back-up, and security procedures and configures end-user tools. The output from this phase is a deployment plan which is shared with the client.

5. Deployment: In this final development phase, the Company conducts a deployment meeting with the client, walking through the deployment plan. The Company also analyses final load files from the client and loads the database with live data. The Company provides end-user tool training and access to the data as outlined in the 4 deployment plan. After a one to two month period, the final step is a post-project review with the client to ensure that the multi-channel marketing database is meeting the client's expectations.

DETAILED DESCRIPTION OF THE INVENTION

The invention provides a methodology for developing a service offering that enables multi-channel marketers to analyze, create, track, control, coordinate, and execute marketing strategies across multiple customer touchpoints using various communications media and methods.

An example of such a system is the MarketSmart Decision System (see FIGS. 2 and 3 and the related discussion below) which is produced and marketed by Fair, Isaac and Company, Inc. of San Rafael, Calif.

Goals of the invention include, inter alia:

- Providing a roadmap for teams to follow when implementing a multi-channel marketing database to ensure consistent results that meet or exceed the client's expectations.
- Providing teams with standard forms, project plans, meeting agendas, and client deliverable document sample.
- Defining roles and responsibilities for the team, the client, and other departments that are involved in the multi-channel database development process.
- Defining what information is communicated throughout the project, the communications protocol, e.g. who talks to whom, when, and how, and change and problem escalation procedures between the Company and a client.
- Helping the team to determine which client requirements are out of scope from a standard solution and therefore billable to the client.

Figure 1A:
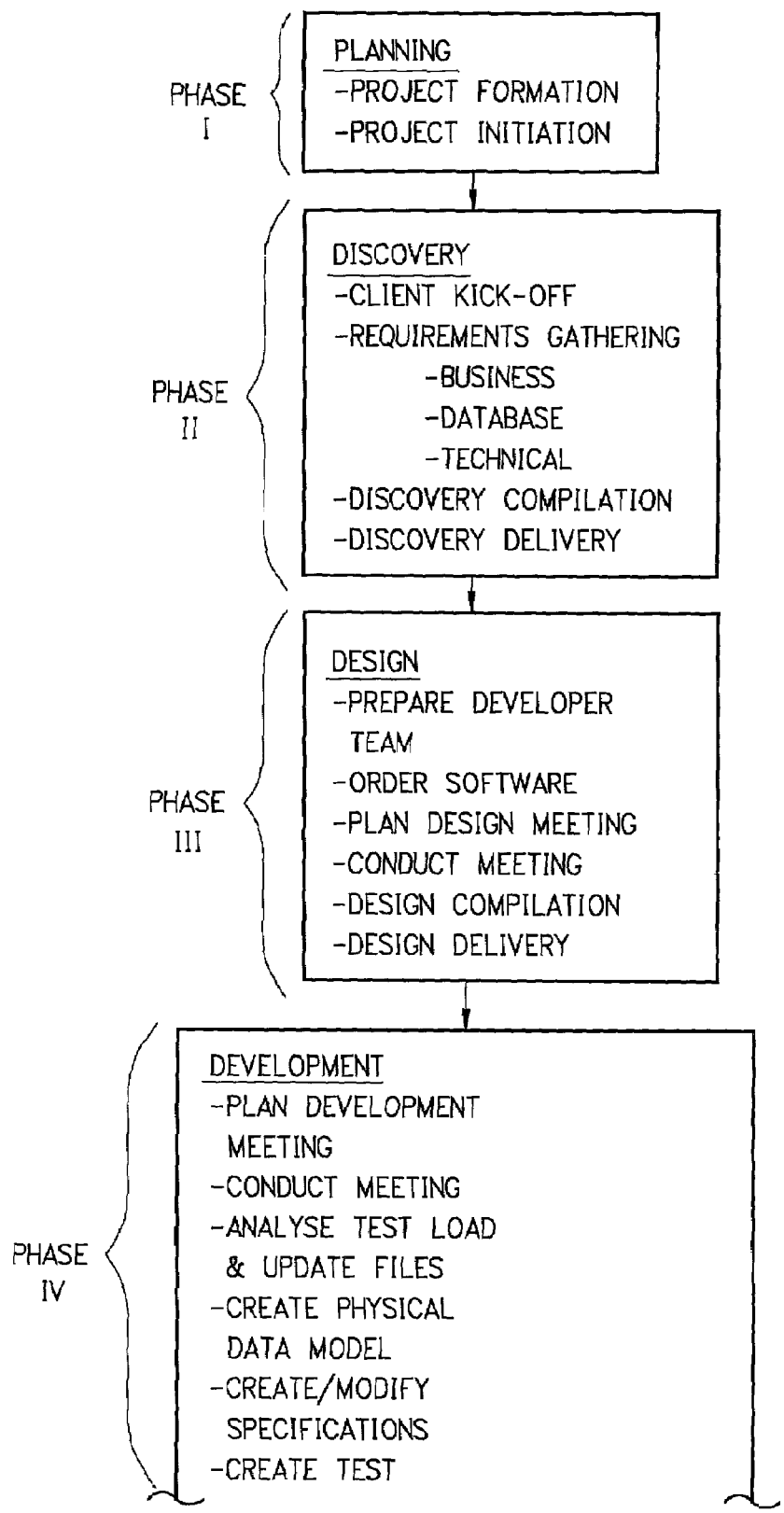
FIGS. 1a and 1b provide a block diagram showing the five phases of a methodology for implementing a multi-channel marketing database according to the invention.
Figure 1B:
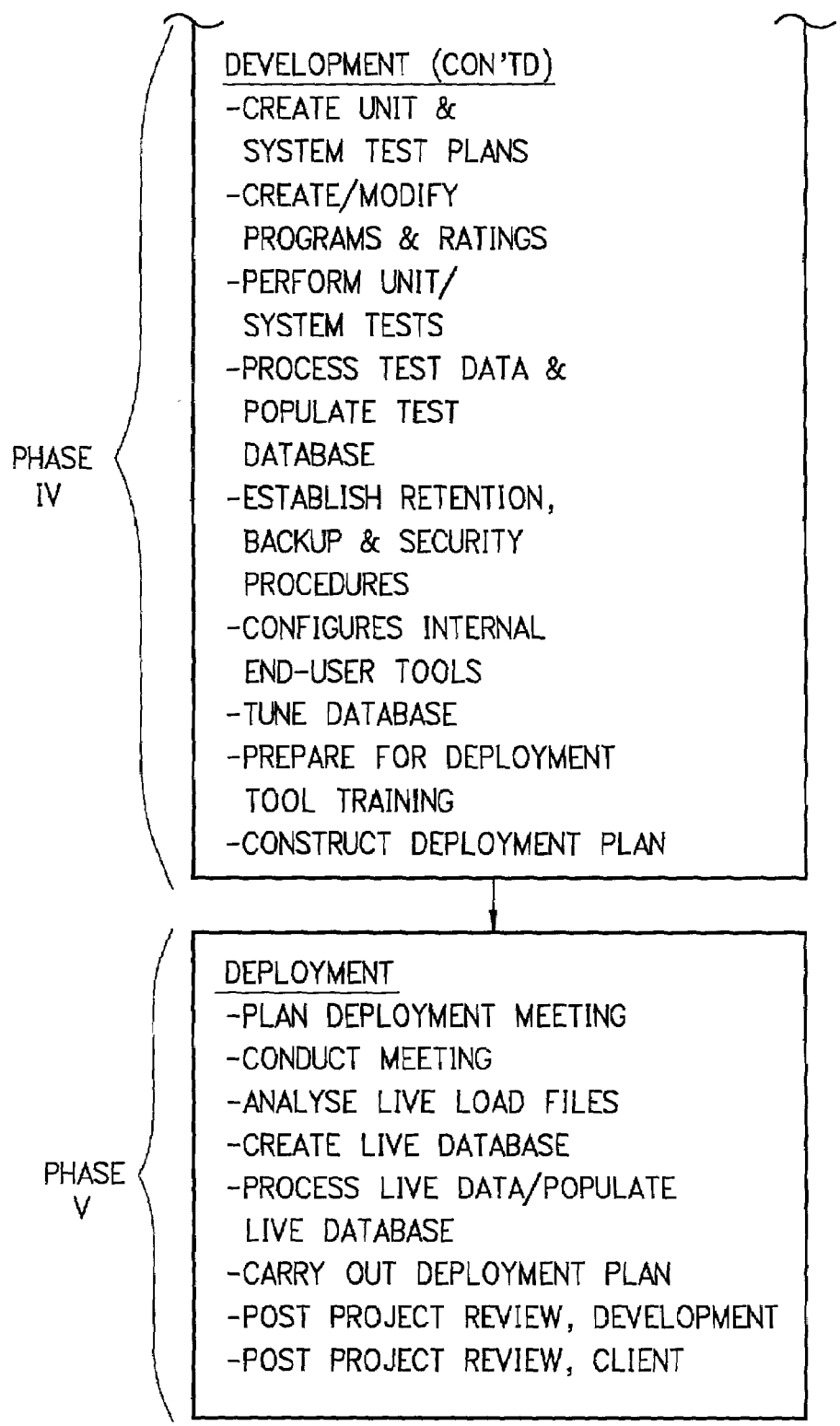

The presently preferred embodiment of the invention provides a methodology that comprises five key phases. FIGS. 1a and 1b provide a block diagram showing the five phases of a methodology for implementing a multi-channel marketing database according to the invention.

1. Planning: In this phase the team is identified from both the Company and the client side. A kick-off meeting is planned that will be held between the client and the Company.

2. Discovery: In the discovery phase, the kick-off meeting is held, as well as a requirements gathering meeting where both business and technical requirements are identified and documented in a discovery document which is given to the client for approval.

3. Design: In this phase, the Company conducts several design meetings with the client to review data analysis from initial test files and determine specifications for data mapping, update rules, calculations, reports, and campaign management. This information is documented in a design document which is also given to the client for approval.

4. Development: During this phase, the Company creates unit and system test plans, creates and modifies actual programs and routines, and performs unit and system tests based upon the specifications outlined in the design document. The Company also establishes retention, back-up, and security procedures and configures end-user tools. The output from this phase is a deployment plan which is shared with the client.

5. Deployment: In this final development phase, the Company conducts a deployment meeting with the client, walking through the deployment plan. The Company also analyzes final load files from the client and loads the database with live data. The Company provides end-user tool training and access to the data as outlined in the deployment plan. After a one to two month period, the final step is a post-project review with the client to ensure that the multi-channel marketing database is meeting the client's expectations.

Once the five phases are complete, the team moves into an on-going support and maintenance mode, If enhancement projects are required along the way, the same methodology can be followed for such enhancements.

Planning

Project Formation

A number of activities must be completed prior to the Multi-Channel Marketing Database project kick-off. Completing these activities ensures that a solid foundation is in place for the client kick-off meeting and subsequent discovery, design, development and deployment phases. The Company executive sponsor appoints a Company project leader to kick off the planning process.

Review Client Expectations

The sales process often results in a much better understanding of the client's expectations for the project. It is critical that the project leader requests this information from the sales person and/or Company executive sponsor. Having this information provides the project leader with a better understanding of how the team should be formed and how the project plan should be constructed.

For a list of questions that may help clarify client expectations, see Table A-1.

TABLE A1

Questions for Clarifying Client Expectations

The following questions may help in clarifying client expectations regarding delivery of the Multi-Channel Marketing Database solution:
  1. Why did the client sponsor purchase Multi-Channel Marketing Database?

TABLE A1-continued

Questions for Clarifying Client Expectations

2. What features within Multi-Channel Marketing Database does the client sponsor particularly like?
3. What features within Multi-Channel Marketing Database does the client sponsor think will require customization?
4. How closely does the Multi-Channel Marketing Database solution reflect the way the client organization looks at its business?
5. How much customization is the client expecting?
6. Why does the client feel customization is required?
7. Is the client sponsor open to reviewing and, possibly modifying, internal processes to align them more closely with what Multi-Channel Marketing Database delivers?
8. Have all areas within the client's company bought into the idea of purchasing the Multi-Channel Marketing Database solution? If not, which areas are not on-board? Why are the areas resisting?
9. Does the client want to migrate a solution in-house at some point?
10. Has it been explained to the client that customization of the Multi-Channel Marketing Database solution will require an additional dollar investment?
11. What is the client's budget?
12. Are the dollars in the budget in line with the amount of customization that the client is requesting? Were phased enhancements discussed?
    If so, what were the enhancements and how did we recommend they be implemented?

Define Project Participants and Roles

As part of the sales process, at least one executive sponsor from the client is identified to champion the Multi-Channel Marketing Database project. The first step in building a solid foundation for the project is for the Company project leader to ask the client executive sponsor to assign a client project leader. Once the client project leader is assigned, the Company project leader works with the client project leader to assemble the team and define roles and responsibilities.

For typical Multi-Channel Marketing Database project participants and roles, see Table A-2.

TABLE A2

Multi-Channel Marketing Database Project Participants and Roles

The grid that follows is meant to serve as a guide only. Information that might prove helpful includes:
The Gartner Group recommends a ratio of 3 business people to 1 IT person during Discovery.
Success during Discovery requires a good cross section of content experts empowered to make decisions.

| Project Phase | FI/Functional Client Role | Role | Team Member Assigned and Time Commitment | Responsibilities |
|---|---|---|---|---|
| Planning | FI | Executive Sponsor | Director or VP 4 hours - 100% | Appoint Company project leader Participate in review of client expectations. |
| | | Project Leader | Account Manager 4-6 days - 100% | Lead review of client expectations. Facilitate definition of project participants and roles Facilitate creation of project plan. Lead planning of client kick-off meeting. Review client executive sponsor responsibilities. Establish project communication standards. |
| | | Technical Manager | Team Manager 4-6 days - 40% | Participate in review of client expectations. Define Company project participants and roles. Participate in creation of project plan. |
| | | Sales Person | Account Exec 2-4 hours - 100% | Participate in review of client expectations. |
| Planning | Client | Executive Sponsor | TBD 1-2 days - 80% | Appoint client project leader. Review client executive sponsor responsibilities. Prepare client kick-off meeting presentation. |

TABLE A2-continued

Multi-Channel Marketing Database Project Participants and Roles

| | | | | |
|---|---|---|---|---|
| | | Project Leader | TBD 3-5 days - 100% | Participate in definition of project participants and roles. Participate in creation of project plan. Participate in planning of client kick-off meeting. Review client executive sponsor responsibilities. Establish project communication standards. |
| Discovery | FI | Relationship Manager | Account Manager 3-5 weeks - 30% | Participate in client kick-off meeting. Take notes during Discovery discussions. Facilitate delivery of Discovery document |
| | | Executive Sponsor | Director, VP 1-2 days - 100% | Participate in client kick-off meeting. |
| | | Project Leader | BSA 3-5 weeks - 100% | Participate in client kick-off meeting. Lead Discovery discussions and keep team members focused. Take notes during Discovery discussions. Lead internal Discovery meetings and assemble Discovery document. Lead delivery of Discovery document. |
| | | Technical Analyst | WAN Administrator 2-3 days - 75% | Participate in discussions regarding technical requirements. Take notes during Discovery discussions. |
| | | Technical Analyst | Programmer/ Analyst 2-3 days - 75% | Run analysis on all analysis files. Summarize analysis findings. |
| | | Technical Manager | Team Manager 3-5 weeks - 15% | Participate in client kick-off meeting. Ensure team members complete tasks; processes and procedures are followed. Review Discovery document prior to delivery to the client. |
| | | Sales Person | Account Exec 1-2 days - 100% | Participate in client kick-off meeting. |
| Discovery | Client | Project Leader | TBD 3-5 weeks - 50% | Present client's mission statement and business objectives. Present client's organizational structure. Participate in discussions regarding technical requirements. Participate in discussions regarding requirements. Participate in delivery of Discovery document. Ensure sign-off of Discovery document is achieved. |
| | | Marketing Specialist | TBD 3-5 weeks - 50% | Provide overview of client's products and/or service offerings. Provide overview of client's target market and competition. Provide overview of client's campaign management strategies. Participate in discussions regarding requirements. Participate in delivery of Discovery document. |
| | | Executive Sponsor | TBD 1-2 days - 100% | Attend and participate in client kick-off meeting. Present client's critical success factors for the project. Participate in discussions regarding requirements. |

TABLE A2-continued

Multi-Channel Marketing Database Project Participants and Roles

| | | | | |
|---|---|---|---|---|
| | | Technical Specialist(s) | TBD 2-3 weeks - 25% | Participate in discussions regarding technical requirements. Participate in delivery of Discovery document. |
| | | Marketing Analyst(s) | TBD 3-5 weeks - 20% | Participate in discussions regarding technical requirements. Participate in discussions regarding requirements. Participate in delivery of Discovery document. |
| Design | FI | Relationship Manager | Account Manager 3-5 weeks - 40% | Lead planning of Design meeting. Participate in Design discussions. Take notes during Design discussions. Facilitate delivery of Design document. |
| | | Project Leader | BSA 3-5 weeks - 100% | Lead Design discussions and keep team members focused. Take notes during Design discussions. Lead internal Design meetings and assemble Design document. Lead delivery of Design document. Order Multi-Channel Marketing Database Software. |
| | | Technical Analyst | Programmer/ Analyst 3-5 weeks - 50% | Participate in Design discussions. Take notes during Design discussions. Participate in delivery of Design document. Run analysis on test files. Summarize analysis findings. |
| | | Technical Analyst | Data Architect 3-5 weeks - 10% | Participate in Multi-Channel Marketing Database data model revisions. |
| | | Technical Manager | Team Manager 3-5 weeks - 20% | Participate in Design discussions. Ensure team members complete tasks; ensure processes and procedures are followed. Review Design document prior to delivery to the client. |
| Design | Client | Project Leader | TBD (Business representative) 3-5 days - 40% | Participate in planning of Design meeting. Participate in Design discussions. Participate in delivery of Design document. Ensure sign-off of Design document is achieved. |
| | | Marketing Specialist | TBD 3-5 weeks - 50% | Participate in Design discussions. Participate in delivery of Design document. |
| | | Marketing Analyst(s) | TBD 3-5 weeks - 20% | Participate in Design discussions. Participate in delivery of Design document. |
| | | Technical Specialist(s) | TBD 2-3 weeks - 60% | Participate in Design discussions. Participate in delivery of Design document. Create test load and update files. |
| Development | FI | Relationship Manager | Account Manager 3-4 weeks - 30% | Participate in weekly conference calls. Participate in planning of Development meeting. Participate in Development meeting. |

TABLE A2-continued

Multi-Channel Marketing Database Project Participants and Roles

| | | | | |
|---|---|---|---|---|
| | | Project Leader | BSA 3-4 weeks - 100% | Lead weekly conference calls. Lead planning of Development meeting. Lead Development meeting. Create/monitor Development project plan. Create/modify specifications. Create/modify unit and system test plans. Establish retention, backup and security procedures. Construct Deployment plan. Work with DBA to create physical data model. |
| | | Technical Analyst | Programmer/ Analyst 3-4 weeks - 100% | Participate in Development discussions. Analyze test load and update files. Create/modify programs and routines. Execute unit/system tests. Test and implement retention, backup and security procedures. Process test data. |
| | | Technical Analyst | Data Architect 3-4 weeks - 5% | Assist with Multi-Channel Marketing Database data model revisions. |
| | | Technical Analyst | Product Support Specialist 1-2 days - 50% | Install and configure internal end-user tools. Configure server software (e.g. ClearManage). |
| Development | FI | Technical Analyst | DBA 3-4 weeks - 10% | Implement data model changes. Create physical data model. Create test database. Tune test database. Implement test database security and permissions. Populate test database. |
| | | Technical Manager | Team Manager 3-4 weeks - 20% | Participate in Development discussions. Ensure team members complete tasks; ensure processes and procedures are followed. |
| | Client | Project Leader | TBD 3-4 weeks - | Participate in weekly conference calls. |
| | | Technical Specialist(s) | TBD 3-4 weeks - 15% | Participate in weekly conference calls Provide test load and update files. Consult on technical issues as they arise. |
| Deployment | FI | Relationship Manager | Account Manager 2-3 weeks - 40% | Lead weekly conference calls. Lead planning of Deployment meeting. Take notes during Deployment discussions. Participate in Company post-project review. Conduct client post-project review. |
| | | Project Leader | BSA 2-3 weeks - 100% | Participate in planning of Deployment meeting. Lead internal Deployment meetings. Lead execution of Deployment plan. Conduct Company post-project review. Participate in client post-project review. |

TABLE A2-continued

Multi-Channel Marketing Database Project Participants and Roles

|  |  |  |  |  |
|---|---|---|---|---|
|  |  | Technical Specialist(s) | Project Manager 2-4 days 30% | Process live data. Participate in Deployment meetings. Participate in Company post-project review.. |
|  |  | Technical Specialist(s) | DBA 1-2 weeks - 10% | Populate live Database. Tune live Database. Establish security and permissions. Participate in Deployment meetings. Participate in Company post-project review. |
| Deployment | FI | Technical Specialist(s) | Product Support Specialist 2-3 days - 100% | Install and configure client software on client PC(s). Provide client tool training. Participate in Deployment meeting. Participate in Company post-project review. |
|  |  | Technical Specialist | WAN Administrator 3-4 days 50% | FI and client connectivity |
|  |  | Technical Specialist | Data Architect 1-2 weeks - 5% | Participate in Multi-Channel Marketing Database live database creation. Participate in establishing Multi-Channel Marketing Database security and permissions. Participate in database tuning. Participate Company Post-Project Review. |
|  |  | Technical Manager | Team Manager 3-5 weeks 10% | Participate in Deployment Discussons. Ensure team members complete tasks. Ensure processes and procedures are followed. Participate Company Post-Project Review. Participate in client Post-Project review. |
|  | Client | Project Leader | TBD (Business representative 3-5 weeks - 5% | Participate in planning of Deployment meeting. Participate in weekly conference calls. |
|  |  | Technical Specialist(s) | TBD 3-5 weeks - 5% | Participate in weekly conference calls |

Create Project Plan

Once all team members are identified and roles and responsibilities are assigned, a project plan is drafted. In most cases, the standard project plan template is used without modification. The project plan is used to communicate roles, responsibilities and timeframes to the client. It is also used to manage the project and measure progress.

For typical Multi-Channel Marketing Database implementation timeframes, see Table A-3.

TABLE A3

Multi-Channel Marketing Database Implementation Timeframes

| Phase | Duration without Changes/Enhancements | Duration with Changes/Enhancements |
|---|---|---|
| Planning | 1-2 weeks | 1-2 weeks |
| Discovery | 2-3 weeks | 4-5 weeks |
| Design | 2-3 weeks | 4-5 weeks |

TABLE A3-continued

Multi-Channel Marketing Database Implementation Timeframes

| Phase | Duration without Changes/Enhancements | Duration with Changes/Enhancements |
|---|---|---|
| Development | Dependent only on data prep requirements | 3-4 weeks plus any additional time required for data prep |
| Deployment | 1-2 weeks | 1-2 weeks |

The duration shown above do not take into consideration additional connectivity requirements or delays in analysis files/requirements from the client.

Project Initiation

Plan Client Kick-Off Meeting

The Company project leader and the client project leader work together to create an agenda for the kick-off meeting and to set the date and time for the meeting. Meeting and travel logistics are discussed at this time as well. The Company project leader also requests that the client prepare and copy analysis files to Company-supported media. Analysis files contain the data that will most likely be used when populating the Multi-Channel Marketing Database data mart. These files are given to the Company team at the client kick-off meeting (see Discovery section).

For a list of common discussion points when planning the client kick-off meeting, see Table A-4.

TABLE A4

Client Kick-Off Meeting Preparatory Discussion Points

In preparing for the client kick-off meeting, the following points can be discussed:
1. Meeting agenda
2. Meeting date(s) and time(s)
3. Meeting attendees
4. Travel, lodging and transportation plans
5. Meeting attire
6. Equipment needs (including phone line availability, if necessary, for demos)
7. Meeting room setup
8. Meeting refreshments
9. Name tags or placards
10. After-hour entertainment
11. Request that analysis files be created and copied to Company-approved media for delivery at the client kick-off meeting. Analysis files contain the data that will most likely be used to populate the Multi-Channel Marketing Database data mart. Additionally, ask that file descriptions, file layouts, field definitions and record quantities accompany the files.

For a sample client kick-off meeting agenda, see Table A-5.

TABLE A5

Client Kick-Off Meeting Agenda

SAMPLE

| | |
|---|---|
| Client Executive Sponsor Keynote Address | 9:00-9:30 |
| Team Introductions | 9:30-9:45 |
| Multi-Channel Marketing Database Demonstration | 9:45-10:00 |
| Multi-Channel Marketing Database Benefits and Deliverables | 10:00-10:15 |
| Multi-Channel Marketing Database Project Scope, Methodology and Timeline Review | 10:15-10:45 |
| Break | 10:45-11:00 |
| Project Communication Standards | 11:00-12:00 |
| Project Communication Guidelines | |
| Change Procedures | |
| Problem Escalation Procedure | |
| Overview of Remaining Discovery Activities | |

Review Client Executive Sponsor Responsibilities

The single most important presentation at the client kick-off meeting is that of the client executive sponsor. For maximum effectiveness, the client executive sponsor presents the reasons for choosing the Multi-Channel Marketing Database solution; how choosing the solution fits with the corporate objectives and why it's important that the client and Company teams work closely together to implement the solution.

Prior to the client kick-off meeting, the Company project leader sets up a conference call with the client project leader and the client executive sponsor(s). The purpose of the conference call is to ensure that a common message is agreed upon and delivered at the kick-off meeting.

Establish Project Communication Standards

The Company project leader works with the Company team and the client project leader to define what information is communicated throughout the project, the communication protocol (e.g. who talks to whom, when, how) and change and problem escalation procedures.

For communication protocol guidelines, see Table A-6.

TABLE A6

Communication Protocol Guidelines

The communication protocol used with each client will vary. Therefore, the following guidelines can be used to jump-start discussions with the client project leader:
Who 1. The Company project leader is responsible for gathering information from the Company team and communicating information to the client project leader.
2. The client project leader is responsible for gathering information from the client team and communicating information to the Company project leader.

| When | How | Why |
|---|---|---|
| As Needed (At least weekly) | Telephone, E-mail, Fax, Teleconference | Ask and answer questions Request documentation, clarification or feedback Confirm receipt of items sent Review status |
| Weekly | Telephone, E-mail, Fax, Teleconference | Update open issues list Transmit deliverables Confirm status |

Prepare Company Team Members for Discovery

In preparation for Discovery, it is highly recommended that all Company team members receive high-level training on Multi-Channel Marketing Database tool capabilities. This training provides Company team members with up-to-date information regarding tool strengths and limitations. Knowing the strengths and limitations of Multi-Channel Marketing Database tools assists the team in asking questions during Discovery that also assist in ensuring the appropriate tool set is chosen.

Discovery

Conduct Client Kick-Off Meeting

The client kick-off meeting can vary in length from two-four hours. The purpose of the client kick-off meeting is to ensure that all project participants understand the Multi-Channel Marketing Database product solution and how it benefits the client organization. This meeting also provides a forum for introducing project participants and reviewing Company's approach to Multi-Channel Marketing Database implementation (including the need for analysis, test and live files at different points within the project). Feedback is requested after each presentation at the client kick-off meeting to ensure the objective of building a common understanding is met. This is often the client team's first exposure to the project. First impressions and "buy in" have a significant impact on the project's success and momentum.

For a Multi-Channel Marketing Database client kick-off meeting agenda, see Table A-5.

Business Requirements Gathering

Gathering business requirements typically requires one full day of discussion with the client. The method for gathering business requirements may vary from client to client. It is critical that the business requirements gathering phase be prefaced with a short discussion regarding the desired outcome. The objectives for gathering business requirements include:

Understanding the client's business, goals and objectives in order to facilitate current and future consultation.

Understanding the direction of the client's business to ensure Company's products and services evolve with the client's business needs.

The business requirements gathering phase is a forum for identifying the client's business requirements. This portion of Discovery does not result in detailed discussions about Multi-Channel Marketing Database customization. The Company project leader may need to remind the group from time to time that customized requirements are researched as to their affect on the base Multi-Channel Marketing Database solution, cost and timelines in the Multi-Channel Marketing Database requirements gathering discussions. Whenever the potential need for customization is identified, a Company team member makes a note and defers further discussion until Multi-Channel Marketing Database requirements gathering discussions. All documentation gathered during this phase is the responsibility of the Company team. Where appropriate, the client supplements Company documentation with its own documentation.

Review Client's Mission Statement and Business Objectives

For the Company team members to fully understand the client's needs, a team member reviews the client's mission statement and business objectives. This information becomes part of the Discovery deliverable.

Review Client's Organizational Structure

It may be important at points within the project to understand reporting and accountability relationships within the client organization. A team member reviews the client's organizational structure and presents a high-level overview of how the groups feed information to each other and use information passed from each other. This information becomes part of the Discovery deliverable.

Review Client's Product and/or Service Offerings

A team member reviews the client's product and/or service offerings. Understanding the client's products and services is critical to understanding how the Multi-Channel Marketing Database solution benefits the client. In addition, understanding any new products or services being researched or developed allows the Company team ample time to ensure smooth integration of the required data within the Multi-Channel Marketing Database solution. This information becomes part of the Discovery deliverable.

Review Client's Target Market and Competition

A team member reviews the client's target market and competition. Company team members must understand the client's target market and competition. Understanding the challenges this presents to the client helps Company team members assist the client in implementing the appropriate promotional strategies. This information becomes part of the Discovery deliverable.

Review Client's Campaign Management Strategies

A team member reviews the client's campaign management strategies. Understanding the client's campaign management strategies allows the Company team to assist the client in forming future marketing strategies and processing efficiencies. This review focuses on campaign management generalities such as:

Number of campaigns executed annually

Promotion quantities

Types of campaigns executed (e.g. prospect, customer)

Campaign channels (e.g. telemarketing, direct mail, internet, etc.)

Models or scorecards required

Requirements to support models or scorecards (e.g. types of models, use of models, number of models)

This information becomes part of the Discovery deliverable.

Review Client's Critical Success Factors for the Multi-Channel Marketing Database Project A team member reviews the critical success factors for the Multi-Channel Marketing Database project. This review is of the utmost importance to Company team members. The success factors become the benchmarks against which the Company team measures project success. Since this discussion is so critical, it is often best handled in a facilitated session. This information becomes part of the Discovery deliverable.

For common critical success factors by industry, see Table B-1.

TABLE B1

Common Critical Success Factors by Industry

Retail

Increase profitability by increasing average store visits, average dollars spent per store visit, average department shopped, average number of items purchased.
Increase profitability by decreasing advertising expenditures by sending offers to those who will respond and dropping offers to those who will not.
Increase market share by converting more prospects into customers and getting current customers to become more loyal.
Increase Lifetime Value of current customers Multi-Channel Marketing Database Requirements Gathering Gathering Multi-Channel Marketing Database requirements typically requires two-twelve hours of discussion with the client. The main goals for
Multi-Channel Marketing Database requirements gathering include:
Understanding how the client will use the Multi-Channel Marketing Database solution to meet business goals and objectives.
Identifying general areas where the base Multi-Channel Marketing Database solution requires customization to meet the client's business goals and objectives.
Understanding what customization is critical and what customization can be addressed after initial implementation.
Facilitating the creation of functional specifications (Discovery document).

The method for gathering Multi-Channel Marketing Database requirements often varies from client to client. It is quite possible that, as a result of this process, it is determined that the Multi-Channel Marketing Database solution is not the correct solution for the client and other solutions, such as a customized solution, are required.

The Multi-Channel Marketing Database requirements gathering phase is a forum for identifying areas where the base Multi-Channel Marketing Database solution requires customization. The Company project leader may need to remind the group from time to time that customized development will impact cost and timelines.

Whenever the need for customization is identified, the client project leader clarifies for the Company team members, the importance of the change or enhancement. The Company project leader reiterates that the goal is to incorporate critical ("show-stopper") changes and enhancements with the initial implementation and handle non-critical changes and enhancements in phases following initial implementation. All documentation gathered during this phase is the responsibility of the Company team. Where appropriate, the client supplements Company documentation with its own documentation.

Any enhancements or deviations from the original proposal or the base Multi-Channel Marketing Database solution are captured on Multi-Channel Marketing Database change forms and used internally during discovery to create the Discovery document, modify pricing and the project plan.

Review Multi-Channel Marketing Database Reports and Templates

A Company team member reviews the Multi-Channel Marketing Database reports and templates with the client team. The purpose of this review is two-fold. First, reviewing the reports and templates provides the team with a complete understanding of the information included in the Multi-Channel Marketing Database reports and query templates. Second, this exercise may lead to a more detailed discussion regarding other requirements that are not part of the standard Multi-Channel Marketing Database solution. During this review, general areas requiring customization are noted. The focus should be on identifying additional requirements, not on prioritizing or writing technical specifications. Enough information should be gathered to fill out the top half of the Multi-Channel Marketing Database change form and to determine whether the enhancement or change is required as part of the initial implementation. This information becomes part of the Discovery deliverable.

Review Client's Additional Requirements

In conjunction with the Multi-Channel Marketing Database report and template review, additional client requirements are documented. Additional requirements might include having additional geographic mapping capabilities, having additional reports, having additional query templates, etc. Enough information is gathered to fill out the top half of the Multi-Channel Marketing Database change form and to determine whether the enhancement or change is required as part of the initial implementation. This information becomes part of the Discovery deliverable.

Review Multi-Channel Marketing Database Data Feeds

During this portion of discovery, client data sources feeding the data mart are identified. The files used to initially load the data mart may differ from the files used to update the data mart on-going. Both load and update files are identified. For each file identified, the following information is gathered: source, file description, file layout, field descriptions, approximate record quantity, and perceived condition of the file. Based on the client's description of the condition of the files, additional Company services such as NCOA, data append, etc. may be considered. This information becomes part of the Discovery deliverable.

As communicated during planning, the client also provides analysis files on Company—supported media for further analysis by Company. Additionally, the client provides copies of the file descriptions, file layouts, field descriptions, record quantities and perceived condition of the files.

This is also a good time to educate the client team about the importance of data trending and data stability. Building a data mart for on-going decision support is different than processing files for one-off projects. For example, a marketer might be interested in analyzing campaign results based on household income ranges. With a one-off project, the ranges might be pre-defined and the data "grouped" prior to the files being sent to Company. Once the data is "grouped" or "aggregated", Company is unable to change the household income groupings because the raw data is unavailable. In a decision support environment, it is often equally desirable to change the definition of the household income ranges, and then look at those new ranges over time. In order to do this, the actual household income (not the range) needs to be stored for each household. By having the lowest level of data, any number of different groupings can be defined and analysis performed.

Review Multi-Channel Marketing Database Calculations

The Multi-Channel Marketing Database solution assumes certain calculations hold true across all clients within an industry. The goal in having a team member review the calculations is to help the client understand the Multi-Channel Marketing Database solution and to identify calculations that need to be discussed further during the design phase. It is important to review the Multi-Channel Marketing Database calculations with the client and identify any Multi-Channel Marketing Database calculations that need to be calculated differently. Enough information should be gathered to fill out the top half of the Multi-Channel Marketing Database change form and to determine whether the enhancement or change is required as part of the initial implementation. This information becomes part of the Discovery deliverable.

For a sample list of Multi-Channel Marketing Database calculations by industry, see Table B-2.

TABLE B2

Multi-Channel Marketing Database Calculations by Industry

Retail

Recency = Today's Date-Last Purchase Date
Frequency = Total number of distinct purchase transaction dates
Monetary = Total dollars spent
Total Items = Total number of distinct purchase line items
Gross Sales = Total sales based sell price (less discounts)
% of Demand = Gross Sales/Total sales based on List Price (before discounts)
Net Sales = Gross Sales - Returns
% of Gross Sales = Net Sales/Gross Sales
Gross Margin = Net Sales-Total Product Costs
% of Net = Gross Margin/Net Sales
Average Number of Departments Shopped = Sum(Total Departments Shopped for Each Customer)/Total Customers
Average Number of Store Visits = Sum(Total Store Visits for Each Customer)/Total Customers
Average Dollars Spent Per Store Visit = Sum(Monetary/Frequency for Each Customer)/Total Customers
Average Number of Items Purchased = Sum(Total Items for Each Customer)/Total Customers Review Multi-Channel Marketing Database Update Requirements A Company team member asks if any deviation from standard updating is required. The Multi-Channel Marketing Database solution's standard updating frequency is monthly. If the client requires more or less frequent updates, the impact on Company resources and client pricing are evaluated. This information becomes part of the Discovery deliverable.

Review Multi-Channel Marketing Database Access Requirements

At least one "super-user" for each Multi-Channel Marketing Database tool is identified at the client location. The super-user is responsible for providing first line tool support to the client organization. This individual should possess a good mix of technical aptitude and business knowledge.

The Company project leader provides the client project leader with the PC requirements for each of the Multi-Channel Marketing Database tools. The Company project leader instructs the client project leader to complete an inventory of each user's PC to see if any HW or SW upgrades are required. The Company project leader also instructs the client project leader that the responsibility for and costs associated with PC upgrades are the responsibility of the client organization and must be completed prior to deployment.

The client project leader identifies individuals within the organization requiring access to the Multi-Channel Marketing Database data mart and completes an inventory of each user's PC. When the inventory is complete, a copy of the Multi-Channel Marketing Database access inventory form is returned to the Company project leader. This information becomes part of the Discovery deliverable.

For a Multi-Channel Marketing Database access inventory form, see Table B-3.

TABLE B3

Multi-Channel Marketing Database Access Inventory Form

The following individuals within the client organization will have access to the Multi-Channel Marketing Database data mart:
Name:
CPU:                         Current: _____   At Deployment: _____
Operating System/Version:    Current: _____   At Deployment: _____
Memory:                      Current: _____   At Deployment: _____
Software to be Installed:
Media Required:
Name:
CPU:                         Current: _____   At Deployment: _____
Operating System/Version:    Current: _____   At Deployment: _____
Memory:                      Current: _____   At Deployment: _____
Software to be Installed:
Media Required:
Name:
CPU:                         Current: _____   At Deployment: _____
Operating System/Version:    Current: _____   At Deployment: _____
Memory:                      Current: _____   At Deployment: _____
Software to be Installed:
Media Required:
Name:
CPU:                         Current: _____   At Deployment: _____
Operating System/Version:    Current: _____   At Deployment: _____
Memory:                      Current: _____   At Deployment: _____
Software to be Installed:
Media Required:
Name:
CPU:                         Current: _____   At Deployment: _____
Operating System/Version:    Current: _____   At Deployment: _____
Memory:                      Current: _____   At Deployment: _____
Software to be Installed:
Media Required:

Multi-Channel Marketing Database Requirements Gathering Deliverables:

Change requests (top_ of forms completed).
Multi-Channel Marketing Database enhancements and changes (Notes).
Client reporting requirements (Notes).
Client data sources (Notes).
Client calculations (Notes).
Phased implementation plan for Multi-Channel Marketing Database enhancements and changes (Notes).
Update requirements (Notes).
Access requirements (Notes).

TABLE B3-continued

Technical Requirements Gathering

Gathering technical requirements typically requires 2-8 hours of discussion with the client. The method for gathering technical requirements may vary from client to client. It is advisable that the technical requirements gathering phase be prefaced with a short discussion regarding the desired outcome. The objectives for gathering technical requirements include:
Identifying connectivity, user access and support requirements.
Identifying retention, backup and security requirements.
Identifying future migration requirements.
Facilitating the creation of the Discovery document.

Any enhancements or deviations from the original proposal or the base Multi-Channel Marketing Database solution are captured on Multi-Channel Marketing Database change forms and used internally during discovery to modify pricing and the project plan. All documentation gathered during this phase is the responsibility of the Company team. Where appropriate, the client supplements Company documentation with its own documentation.

Review Connectivity, User Access and Support Requirements

Defining connectivity requirements early is critical due to the time required to order, install and test hardware. Depending on the connectivity option chosen, implementation can take up to several months. At the time connectivity requirements are gathered, user access and support requirements are also gathered. Query response time, for instance, can be positively affected by upgrading telecommunication hardware. However, query response time can also be positively affected by choosing a premium support level that provides for a dedicated server and maximum up-time. Variables that help define the optimal configuration for the client include expected response time, number of users, anticipated usage, file transfer needs, geographic location, etc.

It is usually most expedient to allow the client's IT department to talk directly with Company's WAN and OS teams. This is best facilitated via a teleconference call with the Company project leader and the client project leader present. The project leader's presence is important to ensure any impacts on cost and timing are addressed.

This information becomes part of the Discovery deliverable. Additional telecommunication milestones are added to the project plan and managed from the project plan.

For a list of questions that can help clarify user access requirements, see Table B-4.

TABLE B4

Questions for Clarifying User Access Requirements

The following questions may help in clarifying user requirements:
 1. How many users will be accessing the data mart?
 2. How many of these users will be accessing the data mart concurrently?
    For what period of time will they be accessing the data mart concurrently?
 3. What types of queries will they be performing?
    Will they be using only the query templates?
 4. What type of system availability do you require (i.e. M-F 8:00-5:00)?
 5. Will usage be daily? Weekly?
 6. How long do you expect to wait for the results of a query?

Review Retention, Backup and Security Requirements

A Company team member reviews Company's standard retention, backup and security measures. The team members identify any special requirements the client has. This information becomes part of the Discovery deliverable.

For a copy of the standard Multi-Channel Marketing Database retention, backup and security procedures, see Table B-5.

TABLE B5

Multi-Channel Marketing Database Retention, Backup and Security Procedures

The standard Multi-Channel Marketing Database retention, backup an security procedures include:
Ability to recover system up to one year previous.
Ability to recover files prior to every major processing step.

Review Future Migration Requirements

A Company team member asks if any future system migration in-house is anticipated. If a client wishes to migrate the Multi-Channel Marketing Database solution in-house, it can be migrated "as is". The client's migration requirements become part of the Discovery deliverable.

For Multi-Channel Marketing Database migration guidelines, see Table B-6.

TABLE B6

Multi-Channel Marketing Database Migration Guidelines

A client wishing to migrate the Multi-Channel Marketing Database solution in-house should understand his/her responsibilities as well as the responsibilities of Company.
Company Responsibilities Export data from client database at Company and write to Company-supported media
Create database ddl (data definition language) and write to Company-supported media
Provide latest hardcopy versions of reports
Provide query and report templates
Provide x hours of migration consulting and training
Provide up-to-date discovery and design documentation
For an additional annual license fee:
Provide load scripts and/or programs to update database (initial and on-going modifications to scripts or programs are the responsibility of the client).
Provide report programs (initial and on-going modifications to programs are the responsibility of the client).
Client Responsibilities Procure hardware
License, install and configure software
Tune operating system, RDBMS, etc.
Create and populate client database at own location using DDL and exported data provided by Company. The DDL may require modification if the client's RDBMS is different than the RDBMS used at Company
"Port" query and report templates
Change and/or enhance system as required
Support system and users
Provide on-going training to internal users Discovery Document Compilation Following the client requirements gathering sessions, the Company team members compile their notes, discuss and confirm requirements and create a Discovery document that is presented to the client recapping discovery findings. This document serves as the foundation upon which to build for the next phase of the project (design). In addition, this document becomes a training tool for new Company employees working on the client account.

In addition to compiling the Discovery document, a Company team member runs analysis on all files provided by the client. Potential anomalies are highlighted and recapped in a one-two page summary. The file analyses and summary are not part of the Discovery document, but are provided to the client for use in the design phase.

For a list of data analysis standards, see Table B-7.

TABLE B7

Data Analysis Standards

Standard data file analysis is performed to ensure that source files conform to the file layout in the following areas:
 1. Data Type - Verify that field data types in the file(s) match field data types specified on the file layout(s). Example: (Numeric, character, boolean, packed, etc.).
 2. Required Field - Verify that all required fields exist in files.
 3. Field Format - Verify that the formats of field values are consistent. Example: (Date format could be yyyymmdd, yy/mm/dd, etc. Currency could require a precision of 2 or 0. SS# and phone number could be formatted with dashes, etc.).
 4. Missing Fields - Verify that fields on file layouts exist in files.
 5. Valid Data Values - Verify that data fields contain valid values. Verify that numeric fields are within minimum/maximum boundaries. Verify that the format of negative numbers is consistent (e.g. parenthesis around value, leading negative sign, etc.).
 6. Key - Verify that files contain one or more key fields where applicable.
The following programs are typically used for analyzing files:
 SAS Proc Frequency - This program is used to check data frequencies within a file.
 PDM060 - This program is used to perform data present analysis and to validate date and alpha field types.
 Multi-Channel Marketing Database Edit Analysis - This program(s) is used to validate whether data values conform to business values as agreed to in Design.

Discovery Document Delivery

Following Discovery document compilation, the Company team delivers the Discovery document and file analyses. This delivery is typically done via a formal presentation and then a working session with hands-on review of the Discovery document. After the document is reviewed by the team, the Company project leader explains the deliverable sign-off procedure. The client is instructed to complete discovery sign-off and then to begin looking at the file analysis output. Reviewing the file analysis output allows the team members to familiarize themselves with the condition of their data files and discuss unexpected anomalies prior to the first design meeting.

Design

Prepare Company Team Members for Design

Once the Discovery document has been accepted and sign-off has been received, the Company project leader assembles the Company team members to review the project plan, Discovery document and training requirements. team members who will be pulled in during later phases are invited to attend this meeting as well. This meeting typically runs one-two hours.

Project plan review—During this review, team members advise the project leader of any known issues that could adversely affect the plan and provide input into the design plan.
Discovery review—The purpose of the Discovery review is to ensure that the time and resources allocated in the project plan for Design are adequate to accommodate the requirements gathered during Discovery. The review also provides an opportunity for team members to ask questions, raise concerns, make comments or advise the project leader of potential roadblocks. A preliminary comparison of the Multi-Channel Marketing Database data model to the client's requirements is highly recommended at this point.

Training review—Company team members may require additional training in preparation for Design. The training most often required centers around end-user access tools. The team manager reviews staff skill levels and recommends and arranges the appropriate training for Company team members.

Order Multi-Channel Marketing Database Software

The Company project leader orders the required Multi-Channel Marketing Database software for Company and client users.

Plan Design Meeting

Once the Company prep meeting is complete and the Multi-Channel Marketing Database software has been ordered, the Company project leader and the client project leader begin planning the design meeting. The purpose of the design meeting is to gather as much detailed information as possible to facilitate the creation of the Design document. The Company project leader reminds the client project leader that the appropriate team members should review file analysis output prior to the design meeting. The duration of the design meeting varies from client to client. Factors that affect the time required include: the number of changes/enhancements identified in discovery, the number of source input files and the preparedness of the team. On average, the time spent at the client site for the design meeting is 2-4 days.

For a list of common discussion points when planning the design meeting, see Table C-1.

For a sample Multi-Channel Marketing Database design meeting agenda, see Table C-2.

TABLE C1

Design Meeting Preparatory Discussion Points

In preparing for the design meeting, the following points can be discussed:
1. Meeting agenda
2. Meeting date(s) and time(s)
3. Meeting attendees
4. Travel, lodging and transportation plans
5. Meeting attire
6. Equipment needs (including phone line availability, if necessary)
7. Meeting room setup
8. Meeting refreshments
9. Name tags or placards
10. After-hour entertainment
11. Ensure that file analyses output has been reviewed (or is being reviewed)

TABLE C2

Multi-Channel Marketing Database Design Meeting Agenda

SAMPLE

Day 1

| | |
|---|---|
| Data Mapping | 9:00-10:30 |
| Break | 10:30-10:45 |
| Data Mapping | 10:45-12:00 |
| Break | 12:00-1:30 |
| Data Analysis Review | 1:30-3:00 |
| Break | 3:00-3:15 |
| Data Analysis Review | 3:15-5:00 |

TABLE C2-continued

Multi-Channel Marketing Database Design Meeting Agenda

Day 2

| | |
|---|---|
| Day 1 Recap | 9:00-9:15 |
| Data Analysis Review | 9:15-11:30 |
| Break | 11:30-1:00 |
| Data Analysis Review | 1:00-3:00 |
| Break | 3:00-3:15 |
| Data Analysis Review | 3:15-5:00 |

Day 3

| | |
|---|---|
| Day 2 Recap | 9:00-9:15 |
| Data Updating Specifications | 9:15-11:30 |
| Break | 11:30-1:00 |
| Calculation Specifications | 1:00-3:00 |
| Break | 3:00-3:15 |
| Mapping, Reporting and Query Template Specifications | 3:15-5:00 |

Day 4

| | |
|---|---|
| Day 3 Recap | 9:00-9:15 |
| Mapping, Reporting and Query Template Specifications | 9:15-10:30 |
| Break | 10:30-11:00 |
| Campaign Management Specifications | 11:00-12:00 |
| Break | 12:00-1:30 |
| Campaign Management Specifications | 1:30-3:00 |

Conduct Design Meeting

The design meeting provides the Company team with an opportunity to gather the detailed information necessary to create technical specifications. Any deviations from the information contained within the Discovery document are recorded on Multi-Channel Marketing Database change form(s). Change forms, unlike during the Discovery phase, require client sign-off before the change or enhancement is incorporated into the final Design document. Change forms are delivered as part of the final Design document. The project plan and client costs are also updated as required and delivered as part of the final Design document.

Data Mapping

The purpose of data mapping is to identify how input fields on client source files are mapped and loaded into the data mart. This session is often best structured as a round table discussion. Documents that support the discussion include the Multi-Channel Marketing Database data dictionary, client source file layouts and file analysis reports. Data mapping rules become part of the Design deliverable.

Data Analysis Review

Reviewing data analysis requires, on average, 1-2 days of discussion. The following goals are achieved during this review:

Identify data cleansing, data conversion, data repair, data enhancement and data edit requirements and assign ownership for tasks.

Data analysis review uses the file analyses delivered to the client during the Discovery phase and the outcome of the data mapping discussion as input to identifying requirements. The contents of each input field mapped to a Multi-Channel Marketing Database data mart field is reviewed for data anomalies. The team members determine ownership for data repair and conversion tasks. The Company team often takes on some of the responsibility for data repair.

Agree on the information that will be included in load and update files and discuss file formats and quantities.

Load and update file formats, contents and quantities are discussed and agreed upon. Agreement may not be reached on all points. Therefore, it is critical that an individual from the Company team assume ownership for following up and making sure the agreement is reached. Additionally, a member of the client team takes on the responsibility for creating test load and update files. Test files are made available to a Company team member at Design document delivery. Ideally, the test files reflect repairs owned by the client team.

Review recommendations made during the Discovery phase for additional processing such as NCOA, data append, etc.

Any recommendations made during the Discovery phase for additional processing such as NCOA, data append, etc. are reviewed in greater detail. Advantages gained from performing these services are put into perspective in terms of what the client will gain.

Define matching logic and consolidation rules.

Agree on file transfer methods for sending/receiving load and update data files.

Data cleansing, conversion, repair, enhancement, editing, matching and consolidation requirements are used when creating and modifying specifications. These same requirements become part of the Design deliverable.

For a list of common questions asked during data analysis review, see Table C-3.

TABLE C3

Common Questions Asked During Data Analysis Review

Are the values shown in this field valid?
Are there other valid field values not shown on the analysis report?
If we run across invalid field values, what should be done? Fix? Reject?
Under what circumstances should records be rejected?
Is there a percentage or threshold for rejects that, when reached, you'd like to be contacted?
Do you want to see rejects? If yes, in what format? Reports? Error files?

Database Updating Specifications

It is important to set the appropriate expectations for the client regarding time required to process updates. The magnitude of file prep, frequency of updates and the approximate file quantities used as input to the database loads and/or updates are important factors in determining the time required. Data archiving rules are also discussed. If the client requires that history be maintained longer than is provided for within the Multi-Channel Marketing Database solution, those needs must be well understood and documented. Database updating specifications and anticipated database update schedules become part of the Design deliverable.

Calculation Specifications

High-level calculation needs discussed first during the Discovery phase are reviewed in greater detail during the Design phase. All calculated values are defined and documented. Calculation specifications become part of the Design deliverable.

Mapping, Report and Query Template Specifications

High-level geographic mapping, report and query template requirements discussed during the Discovery phase are reviewed in greater detail during the Design phase. It is critical that ALL changes and enhancements be fully understood, documented and defined. This information is taken into account when creating and modifying specifications. These same requirements become part of the Design deliverable as do sample geographic maps and report mockups.

Campaign Management Specifications and Schedules

To manage the client's campaigns, a detailed understanding of their campaign management specifications is required. Detail discussion points include, but are not limited to:

| | |
|---|---|
| Rules for keycoding | Classes of mail |
| Types of output required | Vendors supplying or receiving files |
| Transmission vehicles for input and output | Selection and exclusion logic |
| How tests are structured | Finder number assignment |

A campaign schedule is reviewed during this discussion as well. Campaign management specifications and expected campaign schedules become part of the Design deliverable.

Design Document Compilation

Following the Design meeting, the Company team members compile their notes and discuss and confirm detailed requirements. Change forms are created and sent to the client for signoff. After receiving sign-off, system flow charts are created, the Multi-Channel Marketing Database data model and data dictionary are updated and the Design document is assembled. The Design document is a living, changing document that serves as the foundation for all future development. In addition, the Design document serves as a training tool for new Company employees working on the client account.

Design Document Delivery

Following Design document compilation, the Company team members deliver the Design document. This delivery is typically done either via a formal presentation and then a working session with hands-on review or via a series of one or more conference calls. After the document is reviewed by the client team, the Company project leader explains the deliverable sign-off procedure. The client is instructed to complete Design sign-off. At this time, test load and update files are provided to a Company team member for use during development.

Development

Plan Development Meeting

Once the Design document has been accepted and sign-off has been received, the Company project leader plans the development meeting. The purpose of the development meeting is to assemble the required technical personnel responsible for developing and testing programs based on the technical specifications created in the Design phase. Technical personnel might include, but are not limited to, members of the team, members of the WAN team, members of OS and/or members of the division IIS group. During this meeting, the project plan and design specifications are reviewed and time lines are updated. The development meeting typically requires 2+ hours.

For a sample Multi-Channel Marketing Database development meeting agenda, see Table D-1.

For a sample Multi-Channel Marketing Database development project plan, see Table D-2.

TABLE D1

Multi-Channel Marketing Database Development Meeting Agenda

SAMPLE

| | |
|---|---|
| Introduction of Team Members | 9:00-9:05 |
| Project Plan Review | 9:05-9:15 |
| Design Specification Review | 9:15-10:45 |
| Training Needs Review | 10:45-11:00 |

TABLE D-2

Multi-Channel Marketing Database Development Project Plan

| | Week 1 | Week 2 | Week 3 | Week 4 | Week 5 | Week 6 |
|---|---|---|---|---|---|---|
| Weekly Conference Calls | | | | | | |
| Establish schedule and participants for weekly development conference calls. | I | | | | | |
| Review test load and update file analysis and discuss changes required to data prep and integration specifications, if any. | I | | | | | |
| Discuss development plans and status. | I | I | I | I | I | I |
| Review status of items on open issues list. | I | I | I | I | I | I |
| Confirm status of expected deliverables for week. | I | I | I | I | I | I |
| Deliverables | | | | | | |
| Test load and update files analysis reports. | C | | | | | |
| Updated open issues list. | C | C | C | C | C | C |
| Updated project plan. | C | C | C | C | C | C |
| Change request forms. | C | C | C | C | C | |
| Updated specs - Data prep and integration (Design document). | C | | | | | |
| Updated specs - Database management. | | I | | | | |
| Updated specs - Reports. | | I | | | | |
| Updated specs - Query templates. | | | I | | | |
| Updated specs - Database synchronization. | | | I | | | |
| Updated database transaction file layouts. | | | I | | | |
| Test database (shell). | | | I | | | |
| Unit test plans - Data prep and integration. | | I | | | | |
| Unit test plans - Database management. | | | I | | | |
| Unit test plans - Reports. | | | I | | | |
| Unit test plans - Query templates. | | | | I | | |
| System test plan. | | | | I | | |
| Programs - Data prep and integration. | | 1/4 | 1/2 | 3/4 | I | |
| Programs - Database management. | | | 1/3 | 2/3 | I | |
| Programs - Reports. | | | | | I | |
| Programs - Query templates. | | | | | I | |
| Programs - Database synchronization. | | | | | I | |
| Test database (populated). | | | | | I | |
| Retention, backup and security documentation. | | | | | | C |
| Access to test database via enduser tools. | | | | | I | |
| Multi-Channel Marketing Database deployment plan. | | | | | | C |
| Actions | | | | | | |
| Plan development meeting. | I | | | | | |
| Conduct development meeting. | I | | | | | |
| Company team member training. | | I | I | I | I | |
| Unit testing - Data prep and integration. | | | | I | | |
| Unit testing - Database management. | | | | I | | |
| Unit testing - Reports. | | | | I | | |
| Unit testing - Query templates. | | | | I | | |
| Unit testing - Database synchronization. | | | | I | | |
| System testing. | | | | | | I |

Key:
C Client Deliverable
I Internal Deliverable

Conduct Development Meeting

As noted above, the purpose of the development meeting is to assemble the required technical personnel responsible for developing and testing programs based on the technical specifications created in the Design phase. Technical personnel might include, but are not limited to, members of the team, members of the WAN team, members of OSI and/or members of the division IIS group. During this meeting, the following tasks are completed:

Project plan review—During this review, Company team members advise the Company project leader of any known issues that could adversely affect the plan and they provide input into the development plan.

Design specification review—The purpose of the design specification review is to ensure that the time and resources allocated in the project plan accommodate the requirements of the design specifications. The review also provides an opportunity for development staff to ask questions, raise concerns, make comments or advise the project leader of potential roadblocks.

Training review—Company team members may require additional training in preparation for roll-out of the client's Multi-Channel Marketing Database solution. The training most often required centers around end-user access tools. The Company team manager reviews staff skill levels and recommends and arranges the appropriate training for Company team members.

Analyze Test Load and Update Files

The test load and update files received during Design document review are analyzed by a Company team member. The purpose of test file analysis is to verify that the test files are in the correct format and that the fields contain valid data. Additionally, file quantities are verified. The client project leader is notified of any problems found. If the files are unusable for development purposes, new files are requested. File analysis is performed on all new files received until a usable set of files is provided.

For a list of data analysis standards, see Table B-7.

Create Physical Data Model

The Company project leader works with the DBA to create a physical data model. The physical data model is used when creating and modifying specifications. The physical data model is also used to create the test database.

Create/Modify Specifications

Based on the results of file analysis and based on on-going conversations with the team, specifications agreed to in the design phase may require modification. The development phase may result in numerous modifications to the design specifications. All specification changes must be accompanied by a completed and signed Multi-Channel Marketing Database change form. In addition, the written design specification should be updated to reflect the specification change.

Data Prep and Integration Specifications

Data prep and integration specifications reside in the Design document. Any changes requested to data prep and integration specifications are made in the Design document and are detailed on Multi-Channel Marketing Database change forms. Sections of the Design document focused on data prep and integration include:
  Address hygiene and standardization rules
  Data conversion, data repair and data edit rules
  Matching logic
  Consolidation rules
  Data enhancement rules Create Test Database The primary purpose for creating a test database is to provide a platform for unit and system testing. The test database is created based on the latest Multi-Channel Marketing Database data model.

Create Unit and System Test Plans

Based on specifications written in Design, Company team members develop detailed unit and system test plans. Unit test plans are created to test a single program or unit of work. A single unit of work could be the data conversion of an input file, for example. Edits might be an additional unit of work.

System test plans are designed to "string test" several programs or units of work. Using the previous example, a system test might validate the conversion of multiple unique files and one or more edits on the resulting file. System test plans include all processes from initial file conversion to end-user access.

Data Prep and Integration Test Plans for Initial Load and On-Going Updates

Data prep and integration test plans include detailed test cases for testing data prep processes. The test cases test or verify:
  Address hygiene and standardization rules
  Data conversion, data repair and data edit rules
  Matching logic
  Consolidation rules
  Data enhancement rules Database Management Test Plans for Initial Load and On-Going Updates Database management test plans include detailed test cases for testing database load and update processes.

Report Test Plans

Report test plans include detailed test cases for testing report production as defined in the Design document. The test cases test or verify:
  Report formatting and standards
  Data accuracy
  Calculations
  Processing time Query Template Test Plans Query template test plans include detailed test cases for testing query templates as defined in the Design document. If mapping templates are part of the Multi-Channel Marketing Database solution, they also require test plans. The test cases test or verify:
  Data accuracy
  Calculations
  Processing time Create/Modify Programs and Routines Finalized specifications are used to guide the development and/or modification of programs and routines.

Data Prep and Integration Programs for Initial Load and On-Going Updates

Data prep and integration specifications are used to create the required programs and/or routines to prep data for database loads and/or updates. Data prep and integration programs are typically written for the mainframe environment and make use of software packages such as Group-1, COBOL, SAS, Syncsort, and DynaMatch. Since client files and specifications differ widely, there are no "base" programs or routines that can be cloned. There are, however, examples of jobs in DMI.EXAMPLES.

Database Management Programs for Initial Load and On-Going Updates

Database management programs take data that's been prepped as input and populate database tables as output. Database management programs for the initial load often vary considerably from the programs used to process on-going updates. Database management programs typically make use of software packages such as database load utilities or COBOL with ESQL.

Report Programs

Reports generated via programs differ from reports generated via query and reporting tools. The former make use of programs written in COBOL with ESQL and run only when initiated by Company personnel. The latter are generated via SQL generated by the query tool and are run on-demand by Company or the client. Report programs are run after each database load or update. Report output is typically made available to the client through Company's Digital Services.

Query Templates

Query templates are used in conjunction with query tools to generate on-demand reports. Query templates are used most frequently by clients "as is", but can be customized by the client to meet his/her specific needs. A base set of query templates written by Company is typically included with each Multi-Channel Marketing Database solution.

Perform Unit/System Tests

Unit and system testing is performed after programs are created. Testing follows the unit and system test plans constructed earlier in development.

Process Test Data and Populate Test Database

Processing test data and populating the test database are executed using programs developed and tested earlier in development. After all data has been prepped, files used to populate the database are verified. Once files are verified, a database load request form is completed and sent to OSI. OSI then handles the population of the test database.

Establish Retention, Backup and Security Procedures

During this phase of development, the Company team members document, test and implement retention, backup and security procedures. Procedures documented, tested and implemented include:

|  | Documented | Tested | Implemented |
|---|---|---|---|
| Retention |  |  |  |
| Which files are retained and at what point during processing? | • | • | • |
| How many generations of files are retained? | • | • | • |
| Where are files retained (e.g. onsite, offsite)? | • | • | • |
| How long are files retained? | • | • | • |
| Backup |  |  |  |
| Which files are backed up and at what point during processing? | • | • | • |
| What is the disaster recovery plan for the client? | • | • | • |
| What backup methods are used (e.g. FDR, disk mirroring, etc.)? | • | • | • |
| Security |  |  |  |
| What confidentiality agreements need to be signed that have not already been signed? | • | • | • |
| Who can access the Multi-Channel Marketing Database data mart? |  |  |  |
| What level of password protection is required? | • | • | • |
| What documents, if any, are to be shredded rather than recycled? | • | • | • |

Configure Internal End-User Tools

The purpose for configuring end-user tools internally is to prepare for performance and acceptance testing. Prior to configuring tools, the appropriate software is installed on the appropriate Company PCs. Once the software is installed, configuration and testing begins. The end-user tools are configured to access the physical database, therefore a relatively static database structure is desired.

Perform Database Tuning

After the test database has been populated and tools have been configured and tested, the Company team members evaluate the performance of queries run against the database, maps generated off data residing within the database, reports run, update processes run, etc. Based on the results of these tests, indices are created or modified and database tables are placed on the appropriate drives.

Prepare for Deployment Tool Training

Preparing for deployment tool training is extremely important. Numerous tasks must be completed prior to arrival at the client site. In order to ensure that the trip is as productive as possible and is used for the purpose intended, it is extremely important that the Company team members AND the client team members arrive prepared. The Company project leader confirms the following with the client project leader:
  Client PCs meet all minimum requirements for the software that will be installed.
  The media the software will be delivered on has not changed.
  The software that will be installed at the client site resides at Company.
  The required connectivity is in place and has been tested.

Additionally, the Company project leader asks the client project leader for:
  A brief paragraph describing each person who will be in attendance at training. The paragraph should include title, responsibilities within the organization, technical ability and familiarity with client data.
  Connectivity information. If the client's connection to Company goes through an internal modem pool, performance can be negatively impacted. This should be explained prior to arriving for training.

The Company trainer(s) are given the information they require to prepare for the trip at this time. The trainer preparing for the WorkShop portion of training verifies that the required indices exist to optimize the queries being performed during the WorkShop.

Construct Deployment Plan

A deployment plan is constructed as soon as possible so as not to the delay the start of deployment once development is completed. The deployment plan provides details of how, who and when the Multi-Channel Marketing Database solution is implemented. The deployment plan becomes part of the development deliverables.

For a sample Multi-Channel Marketing Database deployment project plan, see Table E-2.

Deployment

Plan Deployment Meeting

Upon successful completion of the development phase, the Company project leader and client project leader plan the deployment meeting. The purpose of the deployment meeting is to assemble the required technical experts to review the Multi-Channel Marketing Database deployment plan. Deployment discussion topics include, but are not limited to, live load file review, installation of client software, client tool training and report distribution via Company Digital Services.

In addition to planning the deployment meeting, the Company project leader and client project leader arrange for the creation, delivery and analysis of the live load files prior to the deployment meeting.

For a sample Multi-Channel Marketing Database deployment meeting agenda, see Table E-1.

For a sample Multi-Channel Marketing Database deployment project plan, see Table E-2.

TABLE E1

Multi-Channel Marketing Database Deployment Meeting Agenda

SAMPLE

| Deployment Plan Review | 9:05-10:15 |
|---|---|
| Database Evaluation Review | 10:15-11:15 |
| Training Needs Review | 11:15-12:00 |

TABLE E2

Multi-Channel Marketing Database Deployment Project Plan

|  | Week 1 | Week 2 | Week 3 | Week 8 |
|---|---|---|---|---|
| Weekly Conference Calls |  |  |  |  |
| Review live load file analysis and discuss issues, if any. | I |  |  |  |

TABLE E2-continued

Multi-Channel Marketing Database Deployment Project Plan

|  | Week 1 | Week 2 | Week 3 | Week 8 |
|---|---|---|---|---|
| Discuss deployment plans and status. | I | I | | |
| Review status of items on open issues list. | I | I | I | |
| Confirm status of expected deliverables for week. | I | I | I | |
| Deliverables | | | | |
| Deployment project plan. | C | C | | |
| Live load file analysis reports. | C | | | |
| Updated open issues list. | C | C | | |
| Change request forms, if any. | C | C | | |
| Live database (shell). | I | | | |
| Live database (populated). | | C | | |
| Audit reports from database load. | | C | | |
| Client reports. | | | C | |
| Actions | | | | |
| Plan deployment meeting. | I | | | |
| Conduct deployment meeting. | I | | | |
| Company team member training. | I | I | | |
| Client software installed. | | C | | |
| team member tool training. | | C | | |
| team member WorkShop training. | | C | | |
| Company post-project review. | | | I | |
| Client post-project review. | | | | C |

C = Client deliverables
I = Internal deliverables

Conduct Deployment Meeting

The purpose of the deployment meeting is to assemble the required Company and client technical personnel responsible for deploying the Multi-Channel Marketing Database solution. Technical personnel might include, but are not limited to, members of the team, members of the WAN team, members of OSI and/or members of the division IIS group. During this meeting, the following tasks are completed:

Deployment plan review—During this review, Company and team members are provided an opportunity to advise the project leaders of any known issues that could adversely affect the plan and to provide input to the deployment plan.

Database evaluation reports review—The purpose of the database evaluation reports review is to evaluate database performance prior to loading live data. Based on this review additional database tuning may be implemented on the live database.

Training review—Company team members may require additional training in preparation for roll-out of the client's Multi-Channel Marketing Database solution. The training most often required centers around end-user access tools. The Company team manager reviews staff skill levels and recommends and arranges the appropriate training for Company team members.

Analyze Live Load Files

Live load files are analyzed by a Company team member. The purpose of file analysis is to verify that all files are in the correct format and that the fields contain valid information. Additionally, file quantities are verified. The client project leader is notified of any problems found. If the files are unusable for deployment purposes, new files are requested. File analysis is performed on all new files received until a usable set of files is provided.

For a list of data analysis standards, see Table B-7.

Create Live Database

Preparation for "go live" (deployment) requires that the test database be deleted and a new empty database be created. This new empty database is populated with "live" data during deployment.

Process Live Data and Populate Live Database

Processing live data and populating the live database are executed using programs developed and tested earlier in development. After all data has been prepped, files used to populate the database are verified. Once files are verified, a database load request form is completed and sent to OSI. OSI then populates the live database.

Carry Out Deployment Plan

The Multi-Channel Marketing Database solution is deployed using the deployment plan created in development. The plan addresses, but is not limited to, installation of client software, client tool training, WorkShop training and report distribution.

For a sample Deployment agenda, see Table E-3.

TABLE E3

Multi-Channel Marketing Database Deployment Agenda

| SAMPLE | |
|---|---|
| Day 1 | |
| Software Installation | 12:30-4:00 |
| Day 2 | |
| ((Tool)) Training | 9:00-12:00 |
| ((Tool)) Training | 1:00-5:00 |
| Day 3 | |
| ((Tool)) WorkShop | 9:00-12:00 |
| ((Tool)) WorkShop | 1:00-5:00 |

Conduct Company Post-Project Review

Following deployment, the Company project manager schedules and conducts an internal post-project review to review what went well and what was learned. Possible outcomes of this meeting include:

Identification of additional training required for client team members.

Recommendations for changes to Multi-Channel Marketing Database solution and/or methodology.

Conduct Client Post-Project Review

Following deployment, the Company project manager schedules and conducts a post-project review to review what went well, what was learned and what still needs to be addressed. This meeting is typically scheduled 1-2 months following implementation. Both Company team members as well as team members participate in this review. Possible outcomes of this meeting include:

Identification of additional training required for client team members.

Recommendations for changes to Multi-Channel Marketing Database solution and/or methodology.

Exemplary Multi-Channel Marketing Database

Figure 2:
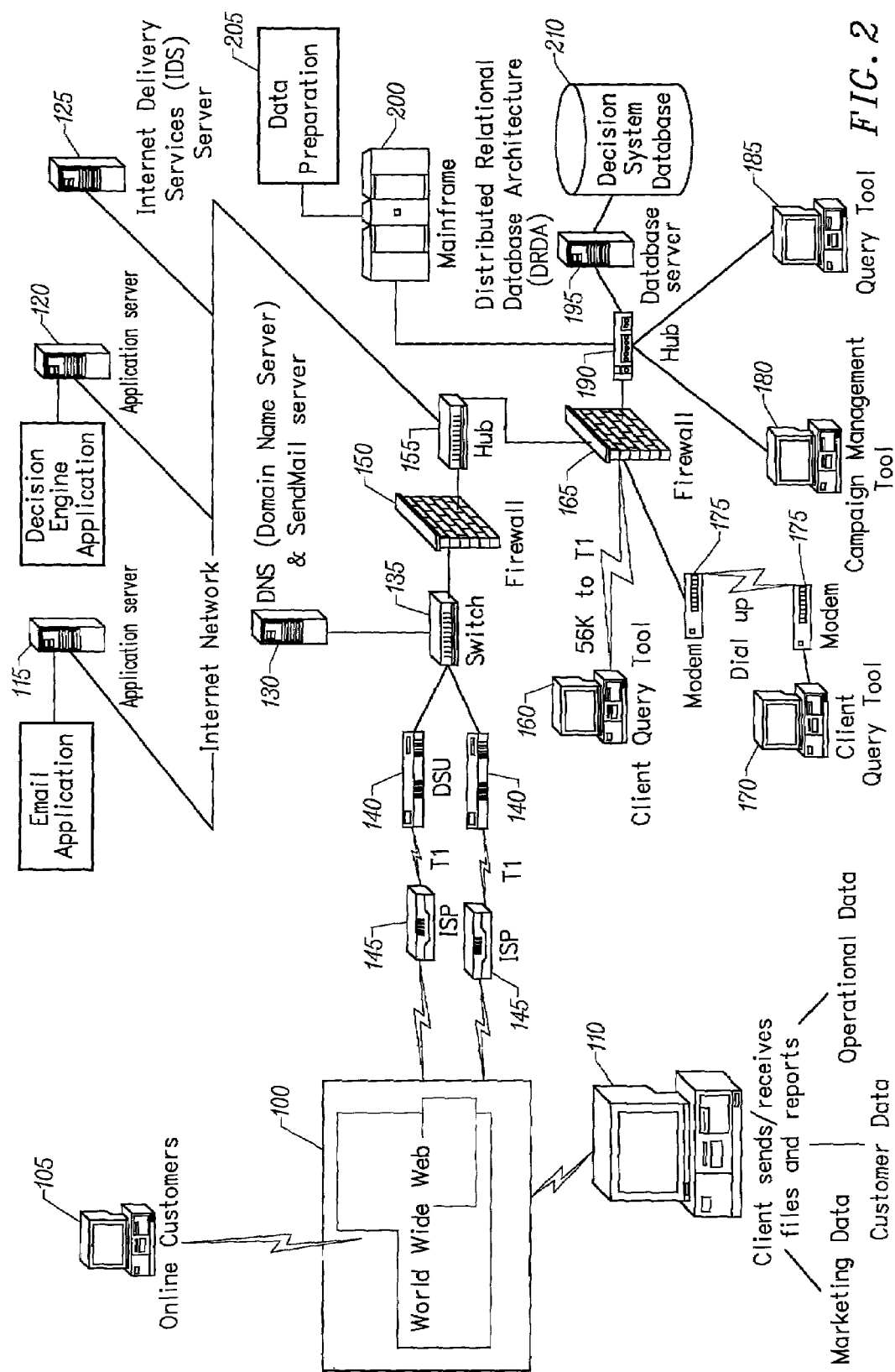
FIG. 2 is a block schematic diagram of a computer network which includes a multi-channel marketing database that may be implemented using the methodology described herein.

FIG. 2 is a block schematic diagram of a computer network which includes a multi-channel marketing database that may be implemented using the methodology described herein. In FIG. 2, the system may be accessed via the worldwide Web 100, by online customers 105, or a system client 110, that sends and receives files and reports which include marketing data, customer data, and operational data. A worldwide Web connection is established, for example, via various ISPs 145, over an internet connection, e.g. a T-1 line, via DSUs 140, and through a switch 145, which provides a point of presence via a domain name server 130. Such system is typically isolated from the public Internet via a firewall 150, which then provides access, via a hub 155. The internal network of such installation, includes an application server, for example, for an e-mail application 115, and application server, for example, for a decision engine application 120, and an Internet delivery services server 125.

The Internet network and the firewall to the public Internet, i.e. the worldwide Web, are also coupled via the hub 155, to a firewall 165, which maintains a private network to which a hub 190, is connected. The private network provides a location for the system herein, and includes a campaign management to 180, a query tool 185, a database server 195 for the decision system database 210, and a computer such as a mainframe 200, which is used for data preparation 205. The system also allows client query, for example, via a client query tool 160, which allows direct connection via the firewall 165, or via a dial-up client query tool 170, which relies upon a modem connection 175.

The preferred embodiment of the invention implements a system that comprises a central database, i.e. an operational data store (ODS), as well as data marts which support analytic and campaign management functions. The preferred embodiment of the invention further implements data models that represent useful and necessary data for marketing initiatives in the retail, catalog, bankcard, telecom, and other markets. Processing methods for standardizing and cleansing data from a client's legacy systems are provided to transform incoming data and catalog such data into a data model of the ODS that is specific to the client's industry and business model.

The ODS is updated as often as necessary and/or desirable with input data provided by the client. It is subsequently updated with additional demographic or other enhancement data purchased by the client as might be useful to support and improve their marketing efforts. The process of updating the ODS with new information also produces management reporting on the contents of the ODS, notifying marketers and other users of the system as to the status of the database and opportunities that may then exist for marketing programs. The process of updating the database also generates and updates summary statistics that provide the marketing user with additional insight as to the marketing opportunity inherent in the customer portfolio represented within the system.

The ODS then serves as the single view of the customer that can be accessed by marketers across the client organization. The update process automatically generates updates to the function-specific data marts that have also been created within the system. These data marts support reporting and analytics, and campaign management, respectively. Each is tuned to meet the unique functional needs required by third party software tools designed to provide this functionality.

An integral part of the service offering is the reporting to support the marketing efforts. These reports are unique to the industry supported by the system, e.g. retail, catalog, bankcard, and telecom, and are generated using the third party reporting software that may be integrated with the system. They are unique to and dependent upon the data model and incorporated into the solution. The data model designed for the reporting and analytic data mart also supports direct access by the client using third party software tools, thereby enabling exploration of the data, the generation of new insights, and the creation of predictive and/or descriptive models to optimize marketing efforts and quantify marketing outcomes.

The campaign data mart optimizes the performance of campaign management software tools provided by third party software providers. In the presently preferred embodiment of the invention, it is tailored to the unique needs of various industry segments, e.g. retail, catalog, bankcard, and telecom. The campaign data mart includes the data elements and summarization's that are necessary to support successful marketing campaigns in those industry segments and it supports the creation and use of predictive and descriptive models to optimize campaign results. It also supports a continuous-loop feedback mechanism that allows marketing actions taken by any user to be tracked and immediately accessible to other system users.

Figure 3:
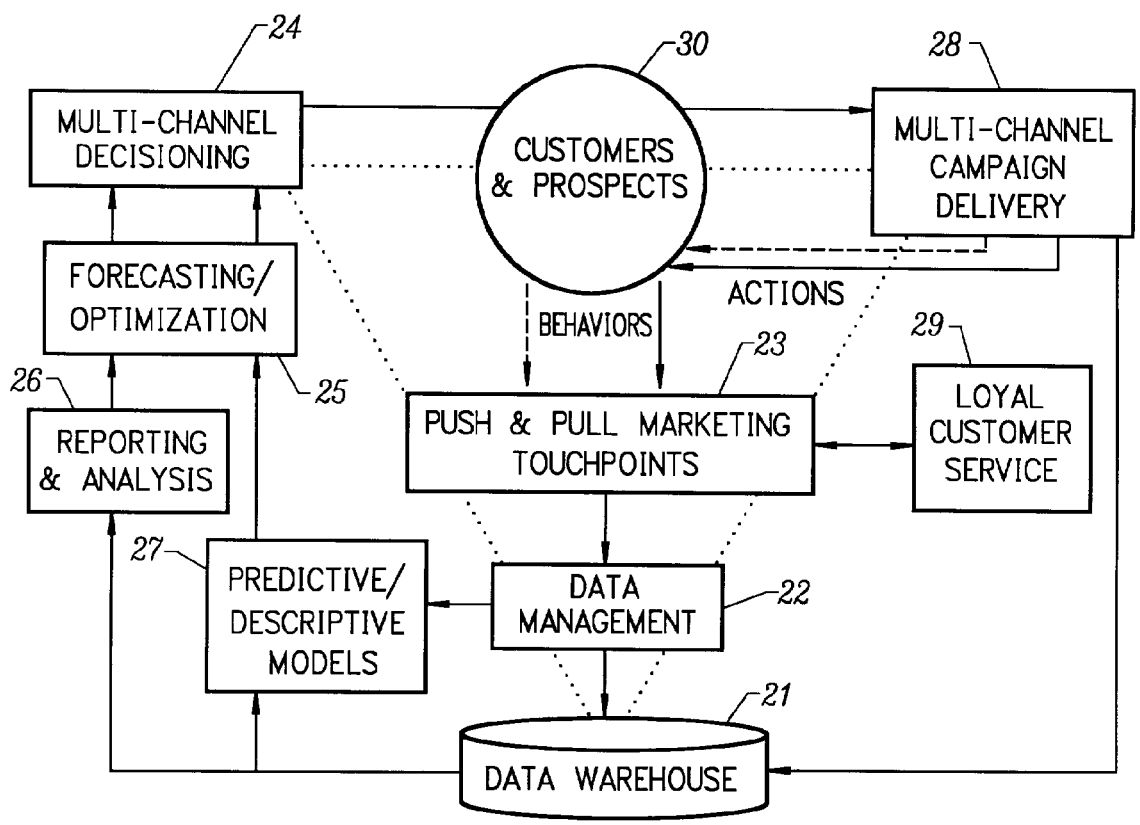
FIG. 3 is a block schematic diagram which shows various functional elements of the multi-channel marketing database which is implemented using the methodology described herein.

The various functional elements of the multi-channel marketing database which is implemented using the preferred embodiment of the invention are discussed below in connection with FIG. 3, in which system interaction with user customer and prospects 30 is described.

Data Warehouse

A key aspect of the herein disclosed decision system is a powerful data warehouse 21 that is built to meet business and IT needs.

Data Management

A data management module 22 allows the user to know that the data used to manage customer relationships are always clean and up-to-date. Besides handling routine data hygiene, the system continually updates the data warehouse with customer activity data and valuable enhancement data that address particular customer management needs. Response information is tracked back into the database to refine segmentation and other marketing strategy design, making future promotions even more effective. The result is a marketing system that boosts short-term marketing return and helps build customer relationships that improve long-term profitability.

Push and Pull Marketing Touchpoints

Profitable customer management begins with the user knowing their customers. Yet few companies have the cross-channel knowledge required for consistent, personalized customer management and marketing decisions. In the system disclosed herein, information is collected at all push and pull touchpoints 23, including email, direct mail, stores, inbound and outbound telemarketing, Web sites and kiosks. As a result, the user has a complete picture of each customer's behavior and preferences. This helps drive profitability across all user channels and product lines.

Multi-Channel Decisioning

A multi-channel decisioning module 24 integrates powerful decisioning tools that help the user create, test and execute strategies across their business. By combining analytics with software tools, the system offers unparalleled decisioning power. It also gives the user the ability to analyze marketing results and integrate strategies across channels. This allows the user to know which elements of a multi-channel marketing campaign are effective and which are not. This also allows automatic triggering of personalized Web pages and offers based on a visitor's clickstream and purchase history. This also allows matching the right action to the right credit account at just the right time.

Forecasting/Optimization

With the pressure to demonstrate Internet success high and the pressure to improve margins even higher, the heat is on for retail marketers to get the right offers to the right prospects and customers right now. To accomplish this, the invention provides data-driven strategy design tools 25 which allow the user to assess offers and messages against customer feedback data, refine the offers and messages, and re-implement them before any acquisition and retention opportunities are lost. These tools also help the user to avoid channel conflict by optimizing results across all channels. Thus, the user always knows exactly which channels to use with which customers at which time in the sales cycle.

Reporting and Analysis

Users have convenient, round-the-clock access to data via a secure client Web site, as well as desktop query and reporting tools 26. Users have instant access to in-depth data for profiling customers and producing both standard and ad hoc reports. Thus, users can get critical information into the hands of decision-makers faster and more conveniently.

Predictive Models

The systems helps a user to decide which prospects and customers to pursue. The system also helps a user to match the right offer to the right customer at the right time. Using predictive and descriptive models 27, a user can make reliable decisions based on volumes of actual customer and prospect information, instead of untested assumptions. The system selects and weights the data elements that go into each model, providing retail-specific models to support a variety of strategy optimization needs. The system thus enables much more effective marketing efforts by allowing a user to identify those prospects that are most likely to respond to an offer, customers that are most likely to leave, or the revenue potential of prospects and customers.

Multi-Channel Campaign Delivery

The prospect of marketing individually to millions of consumers can be daunting and deters many retailers from initiating true CRM programs. The system overcomes this challenge by automating the labor-intensive campaign management process. It features state-of-the-art campaign management tools 28 that are easy to use. thus, a user can manage event-driven marketing programs and calculate their profitability right from the desktop. As a result, it is no longer necessary to rely on scarce IT resources to execute and manage campaigns.

With the system herein disclosed, information is collected at both push and pull touchpoints, including email, direct mail, inbound and outbound telemarketing, Web sites and kiosks, and is transformed into real-time, customer-specific marketing actions. For example, a user can track a Web shopper's click history, combine it with past purchasing behavior, and instantly offer a cross-sell item while the customer is still on the user's site.

Loyalty Customer Service System

Loyalty program members offer the most profit potential. It is therefore critical to provide them with exceptional service. The system makes it easy with a Windows-based access tool 29 that instantly provides customer service and marketing personnel with individual member information. As a result, it is not necessary to build and maintain a separate loyalty system. When a loyalty member has a question about point status or benefits, the user's staff can respond quickly and accurately. In the preferred embodiment, customer service reps can update member files. They can add, change, and delete records, adjust points, and input comments about each customer contact.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for developing a multi-channel marketing database for multi-channel marketers in a computer network, said method comprising the steps of:
   providing a first phase for planning;
   responsive to said providing a first phase for planning, providing a second phase for discovery, comprising business and technical requirements gathering;
   responsive to said providing a second phase for discovery, providing a third phase for design, comprising reviewing data analysis and determining specifications;
   responsive to said providing a third phase for design, providing a fourth phase for development, comprising creating for each market in an organization a physical standard data model for said multi-channel marketing database, creating and modifying software programs and performing unit and system test on the computer network; and
   responsive to said providing a fourth phase for development, providing a fifth phase for deployment comprising the step of ensuring that said multi-channel marketing database is meeting a client's expectations and comprising the step of providing a plurality of reports, each of which corresponds to each market's physical standard data model;
   wherein said multi-channel marketing database provides a service offering that enables said multi-channel marketers to analyze, create, track, control, coordinate, and execute marketing strategies across multiple customer touchpoints using various communications media and methods, and wherein said multi-channel marketing database comprises a push and pull marketing touchpoint element that collects informational data at both push and pull touchpoints, including email, direct mail, inbound and outbound telemarketing, Web sites and kiosks, and performs a real-time, customer-specific marketing action based on said collected informational data.

2. The method of claim 1, wherein once said five phases are complete, an on-going support and maintenance mode is provided.

3. The method of claim 1, wherein said method is again followed if enhancement projects are required once said five phases are complete.

4. The method of claim 1, wherein said planning step further comprises the step of:
   project formation.

5. The method of claim 4, wherein said project formation step further comprises the step of:
   reviewing client expectations.

6. The method of claim 4, wherein said project formation step further comprises the step of:
   defining project participants and roles.

7. The method of claim 4, wherein said project formation step further comprises the step of:
   creating a project plan.

8. The method of claim 1, wherein said planning step further comprises the step of:
   project initiation.

9. The method of claim 8, wherein said project initiation step further comprises the step of:
planning a client kick-off meeting.

10. The method of claim 8, wherein said project initiation step further comprises the step of:
reviewing client executive sponsor responsibilities.

11. The method of claim 8, wherein said project initiation step further comprises the step of:
establishing project communication standards.

12. The method of claim 8, wherein said project initiation step further comprises the step of:
preparing company team members for discovery.

13. The method of claim 1, wherein said discovery step further comprises the step of:
conducting a client kick-off meeting.

14. The method of claim 1, wherein said discovery step further comprises the step of:
business requirements gathering.

15. The method of claim 14, wherein said business requirements gathering step further comprises the step of:
reviewing a client's mission statement and business objectives.

16. The method of claim 14, wherein said business requirements gathering step further comprises the step of:
reviewing a client's organizational structure.

17. The method of claim 14, wherein said business requirements gathering step further comprises the step of:
reviewing a client's product and/or service offerings.

18. The method of claim 14, wherein said business requirements gathering step further comprises the step of:
reviewing a client's target market and competition.

19. The method of claim 14, wherein said business requirements gathering step further comprises the step of:
reviewing a client's campaign management strategies.

20. The method of claim 14, wherein said business requirements gathering step further comprises the step of:
reviewing a client's critical success factors.

21. The method of claim 1, wherein said discovery step further comprises the step of: multi-channel marketing database requirements gathering.

22. The method of claim 21, wherein said multi-channel marketing database requirements gathering step further comprises the step of:
reviewing multi-channel marketing database reports and templates.

23. The method of claim 21, wherein said multi-channel marketing database requirements gathering step further comprises the step of:
reviewing a client's additional requirements.

24. The method of claim 21, wherein said multi-channel marketing database requirements gathering step further comprises the step of:
reviewing multi-channel marketing database data feeds.

25. The method of claim 21, wherein said multi-channel marketing database requirements gathering step further comprises the step of:
reviewing multi-channel marketing database calculations.

26. The method of claim 21, wherein said multi-channel marketing database requirements gathering step further comprises the step of:
reviewing multi-channel marketing database update requirements.

27. The method of claim 21, wherein said multi-channel marketing database requirements gathering step further comprises the step of:
reviewing multi-channel marketing database access requirements.

28. The method of claim 1, wherein said discovery step further comprises the step of:
technical requirements gathering.

29. The method of claim 28, wherein said technical requirements gathering step further comprises the step of:
reviewing connectivity, user access, and support requirements.

30. The method of claim 28, wherein said technical requirements gathering step further comprises the step of:
reviewing retention, backup, and security requirements.

31. The method of claim 28, wherein said technical requirements gathering step further comprises the step of:
reviewing future migration requirements.

32. The method of claim 1, wherein said discovery step further comprises the step of:
discovery document compilation.

33. The method of claim 1, wherein said discovery step further comprises the step of:
discovery document delivery.

34. The method of claim 1, wherein said design step further comprises the step of:
preparing company team members for design.

35. The method of claim 1, wherein said design step further comprises the step of:
ordering multi-channel marketing database software.

36. The method of claim 1, wherein said design step further comprises the step of:
planning a design meeting.

37. The method of claim 1, wherein said design step further comprises the step of:
conducting a design meeting.

38. The method of claim 37, wherein said conducting a design meeting step further comprises the step of:
data mapping.

39. The method of claim 37, wherein said conducting a design meeting step further comprises the step of:
data analysis review.

40. The method of claim 37, wherein said conducting a design meeting step further comprises the step of:
updating database specifications.

41. The method of claim 37, wherein said conducting a design meeting step further comprises the step of:
determining calculation specifications.

42. The method of claim 37, wherein said conducting a design meeting step further comprises the step of:
determining mapping, report, and query template specifications.

43. The method of claim 37, wherein said conducting a design meeting step further comprises the step of:
determining campaign management specifications and schedules.

44. The method of claim 1, wherein said design step further comprises the step of:
design document compilation.

45. The method of claim 1, wherein said design step further comprises the step of:
design document delivery.

46. The method of claim 1, wherein said development step further comprises the step of:
planning a development meeting.

47. The method of claim 1, wherein said development step further comprises the step of:
conducting a development meeting.

48. The method of claim 1, wherein said development step further comprises the step of:
analyzing test load and update files.

49. The method of claim 1, wherein said development step further comprises the step of:
    creating/modifying specifications.

50. The method of claim 49, wherein said creating/modifying specifications step further comprises the step of:
    performing data preparation and determining integration specifications for initial load and ongoing updates.

51. The method of claim 49, wherein said creating/modifying specifications step further comprises the step of:
    developing database management specifications for Initial Load and On-Going Updates.

52. The method of claim 49, wherein said creating/modifying specifications step further comprises the step of:
    developing report specifications.

53. The method of claim 49, wherein said creating/modifying specifications step further comprises the step of:
    developing query template specifications.

54. The method of claim 49, wherein said creating/modifying specifications step further comprises the step of:
    creating a test database.

55. The method of claim 1, wherein said development step further comprises the step of:
    creating one or more unit and system test plans.

56. The method of claim 55, wherein said creating one or more unit and system test plans step further comprises the step of:
    data preparation and developing integration test plans for initial load and on-going updates.

57. The method of claim 55, wherein said creating one or more unit and system test plans step further comprises the step of:
    developing database management test plans for initial load and on-going updates.

58. The method of claim 55, wherein said creating one or more unit and system test plans step further comprises the step of:
    developing report test plans.

59. The method of claim 55, wherein said creating one or more unit and system test plans step further comprises the step of:
    developing query template test plans.

60. The method of claim 1, wherein said development step further comprises the step of:
    creating/modifying programs and routines.

61. The method of claim 60, wherein said creating/modifying programs and routines step further comprises the step of:
    data preparation and developing integration programs for initial load and on-going updates.

62. The method of claim 60, wherein said creating/modifying programs and routines step further comprises the step of:
    developing database management programs for initial load and on-going updates.

63. The method of claim 60, wherein said creating/modifying programs and routines step further comprises the step of:
    developing report programs.

64. The method of claim 60, wherein said creating/modifying programs and routines step further comprises the step of:
    developing query templates.

65. The method of claim 1, wherein said development step further comprises the step of:
    performing unit/system tests.

66. The method of claim 65, wherein said performing unit/system tests step further comprises the step of:
    data preparation and developing integration tests for initial load and on-going updates.

67. The method of claim 65, wherein said performing unit/system tests step further comprises the step of:
    developing database management tests for initial load and on-going updates.

68. The method of claim 65, wherein said performing unit/system tests step further comprises the step of:
    developing reports.

69. The method of claim 65, wherein said performing unit/system tests step further comprises the step of:
    developing query templates.

70. The method of claim 1, wherein said development step further comprises the step of:
    processing test data and populating a test database.

71. The method of claim 1, wherein said development step further comprises the step of:
    establishing retention, backup, and security procedures.

72. The method of claim 1, wherein said development step further comprises the step of:
    configuring internal end-user tools.

73. The method of claim 1, wherein said development step further comprises the step of:
    performing database tuning.

74. The method of claim 1, wherein said development step further comprises the step of:
    preparing for deployment tool training.

75. The method of claim 1, wherein said development step further comprises the step of:
    constructing a deployment plan.

76. The method of claim 1, wherein said deployment step further comprises the step of:
    planning a deployment meeting.

77. The method of claim 1, wherein said deployment step further comprises the step of:
    conducting a deployment meeting.

78. The method of claim 1, wherein said deployment step further comprises the step of:
    analyzing live load files.

79. The method of claim 1, wherein said deployment step further comprises the step of:
    creating a live database.

80. The method of claim 79, wherein said creating a live database step further comprises the step of:
    processing live data and populating a live database.

81. The method of claim 1, wherein said deployment step further comprises the step of:
    carrying out a deployment plan.

82. The method of claim 1, wherein said deployment step further comprises the step of:
    conducting a company post-project review.

83. The method of claim 1, wherein said deployment step further comprises the step of:
    conducting a client post-project review.

84. A method for developing a multi-channel marketing database for multi-channel marketers in a computer network, said method comprising the steps of:
    providing a first phase for planning in which a team is identified from both a Company and a client side; and a kick-off meeting is planned that will be held between said client and said Company;

responsive to said providing a first phase for planning, providing a second phase for discovery in which said kick-off meeting is held, as well as a requirements gathering meeting where both business and technical requirements are identified and documented in a discovery document which is given to said client for approval;

responsive to said providing a second phase for discovery, providing a third phase for design in which said Company conducts more than one design meeting with said client to review data analysis from initial test files and determine specifications for data mapping, update rules, calculations, reports, and campaign management, wherein developed information is documented in a design document which is also given to said client for approval;

responsive to said providing a third phase for design, providing a fourth phase for development in which said Company creates for each market in the client's organization a physical standard data model for said multi-channel marketing database and unit and system test plans for the computer network, creates and modifies actual software programs and routines on the computer network, and on the computer network performs unit and system tests based upon specifications outlined in said design document; wherein said Company also establishes retention, back-up, and security procedures and configures end-user tools; and wherein output from this phase is a deployment plan which is shared with said client; and responsive to said providing a fourth phase for development, providing a fifth phase for deployment in which said Company conducts a deployment meeting with said client, walking through said deployment plan; wherein said Company also analyzes final load files from said client and loads a database with live data; wherein said Company provides end-user tool training and access to data as outlined in said deployment plan; wherein the Company provides a plurality of reports, each of which corresponds to each market's physical standard data model; and wherein, after a one to two month period, a post-project review is held with said client to ensure that said multi-channel marketing database is meeting said client's expectations;

wherein said multi-channel marketing-database provides a service offering that enables said multi-channel marketers to analyze, create, track, control, coordinate, and execute marketing strategies across multiple customer touchpoints using various communications media and methods, and wherein said multi-channel marketing database comprises a push and pull marketing touchpoint element that collects informational data at both push and pull touchpoints, including email, direct mail, inbound and outbound telemarketing, Web sites and kiosks, and performs a real-time, customer-specific marketing action based on said collected informational data.

* * * * *